United States Patent
Yamamoto et al.

(10) Patent No.: US 8,384,946 B2
(45) Date of Patent: Feb. 26, 2013

(54) IMAGE FORMING APPARATUS, METHOD, AND COMPUTER PRODUCT FOR POSITIONING IMAGES OF DIFFERENT SIZE ON A GIVEN PAPER SIZE

(75) Inventors: Kohji Yamamoto, Kanagawa (JP); Hozumi Yonezawa, Tokyo (JP); Takahiro Hirakawa, Kanagawa (JP); Takeshi Yoshizumi, Tokyo (JP); Hiroshi Gotoh, Tokyo (JP); Minako Kazume, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 470 days.

(21) Appl. No.: 12/720,848

(22) Filed: Mar. 10, 2010

(65) Prior Publication Data
US 2010/0231939 A1 Sep. 16, 2010

(30) Foreign Application Priority Data
Mar. 13, 2009 (JP) ................. 2009-062054

(51) Int. Cl.
*H04N 1/387* (2006.01)
*G06T 3/00* (2006.01)
*G06T 3/40* (2006.01)
*G06K 15/02* (2006.01)

(52) U.S. Cl. ........ 358/1.2; 358/1.18; 358/449; 358/451; 382/286; 382/291; 382/295; 382/298

(58) Field of Classification Search .......... 358/1.2, 358/1.9, 1.18, 527, 528, 537, 449–452; 382/286, 382/287, 289, 291, 293, 295, 296, 298
See application file for complete search history.

(56) References Cited

U.S. PATENT DOCUMENTS

| | | | | |
|---|---|---|---|---|
| 4,912,504 A | * | 3/1990 | Ito et al. .................... | 355/61 |
| 6,084,988 A | * | 7/2000 | Kanno et al. ................ | 382/289 |
| 6,501,562 B1 | * | 12/2002 | Nakagiri et al. ............ | 358/1.2 |
| 6,580,521 B1 | * | 6/2003 | Nishikawa et al. .......... | 358/1.18 |
| 6,701,099 B2 | * | 3/2004 | Yokobori et al. ............ | 399/45 |
| 6,873,812 B2 | * | 3/2005 | Kobayashi .................. | 399/193 |
| 8,223,386 B2 | * | 7/2012 | Oyama et al. ............... | 358/1.18 |
| 8,248,652 B2 | * | 8/2012 | Wardell et al. .............. | 358/1.18 |
| 8,270,853 B2 | * | 9/2012 | Shiraishi .................... | 399/24 |
| 2008/0002214 A1 | * | 1/2008 | Xu ........................... | 358/1.1 |

FOREIGN PATENT DOCUMENTS

| | | |
|---|---|---|
| EP | 0 477 569 A2 | 4/1992 |
| JP | 63-236653 A | 10/1988 |
| JP | 07-314843 | 12/1995 |
| JP | 2001-260458 A | 9/2001 |
| JP | 2001260458 A * | 9/2001 |
| JP | 2008-035482 | 2/2008 |

OTHER PUBLICATIONS

Chinese Office Action dated May 18, 2011.
Extended European search report dated Nov. 21, 2012.

* cited by examiner

*Primary Examiner* — Scott A Rogers
(74) *Attorney, Agent, or Firm* — IPUSA, PLLC

(57) ABSTRACT

An image forming apparatus prints images of different document sizes on paper having a predetermined paper size. The image forming apparatus includes a computation processing part to compute a print position of the image with respect to the paper, based on the document size, the paper size and moving amount computation information that is input thereto, and a print processing part to arrange and print the image on the paper, based on the print position computed by the computation processing part.

6 Claims, 21 Drawing Sheets

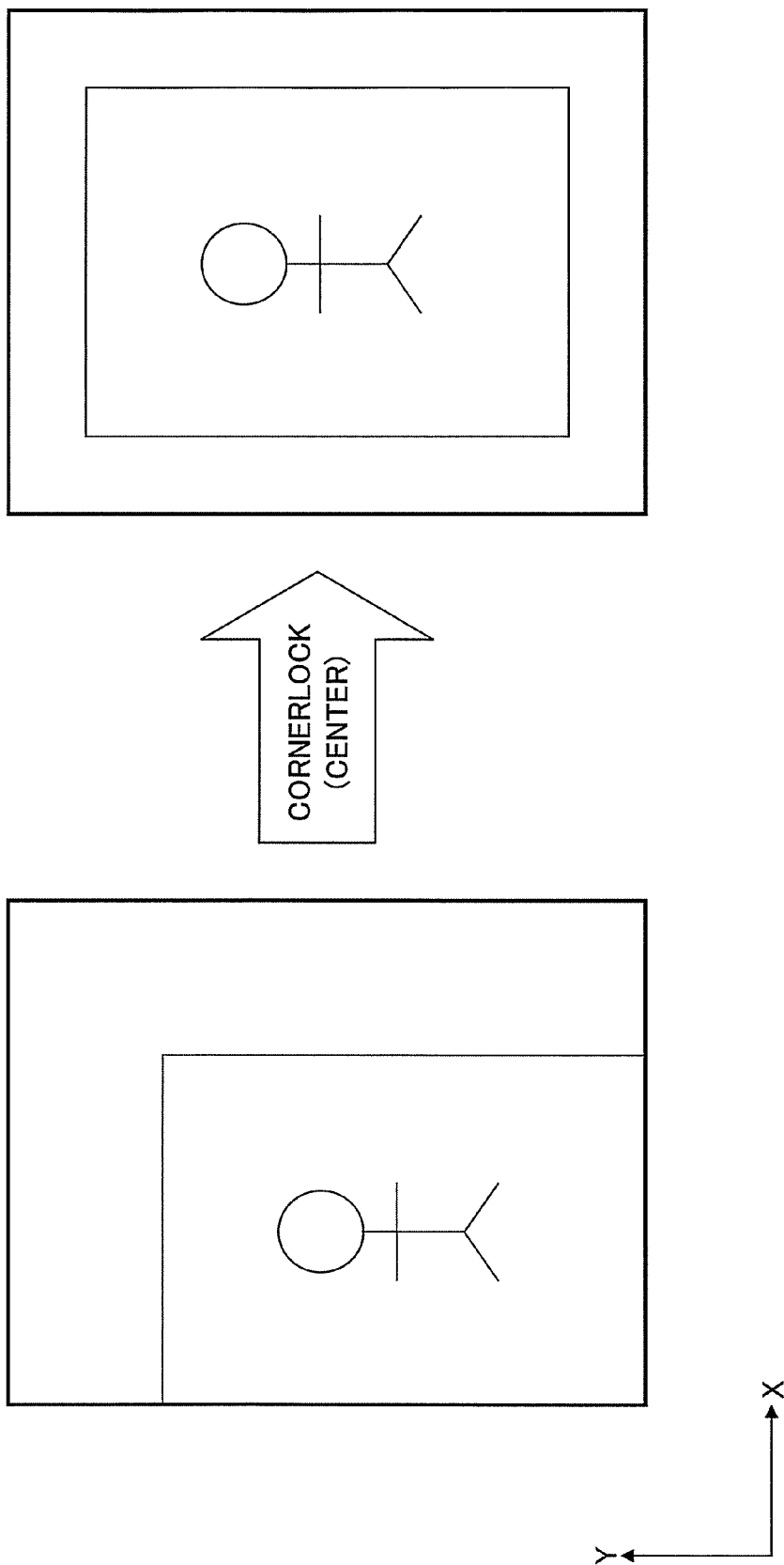

FIG.14
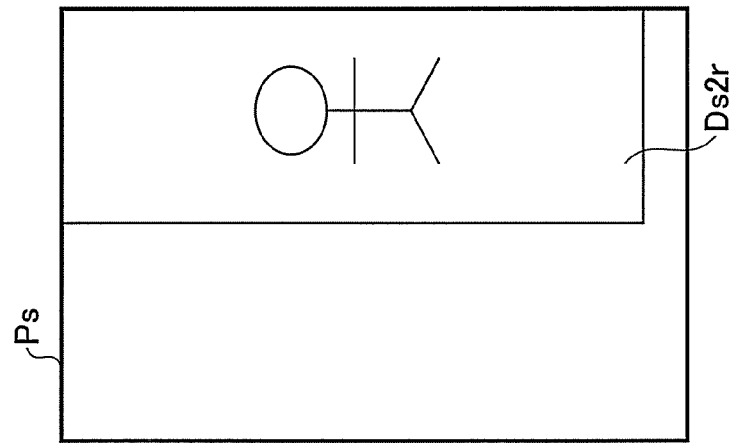
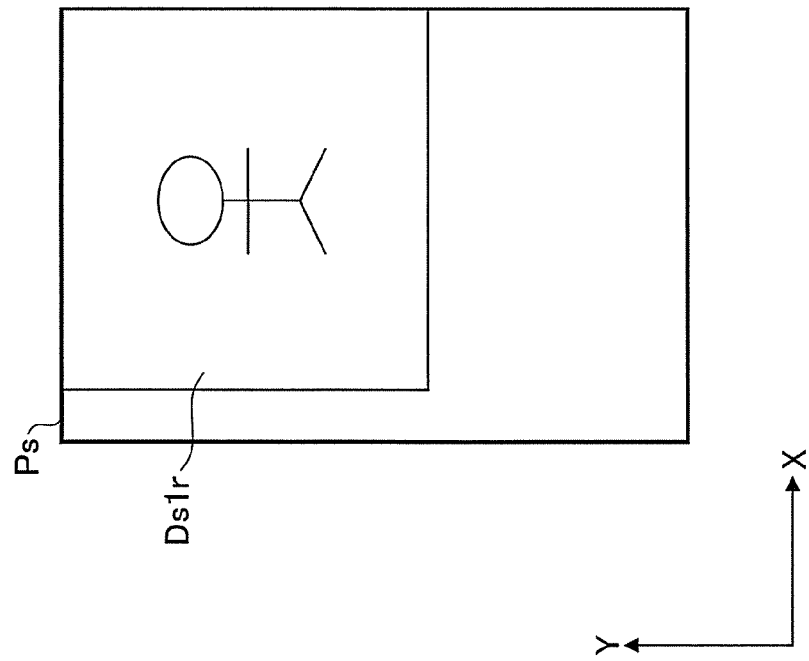

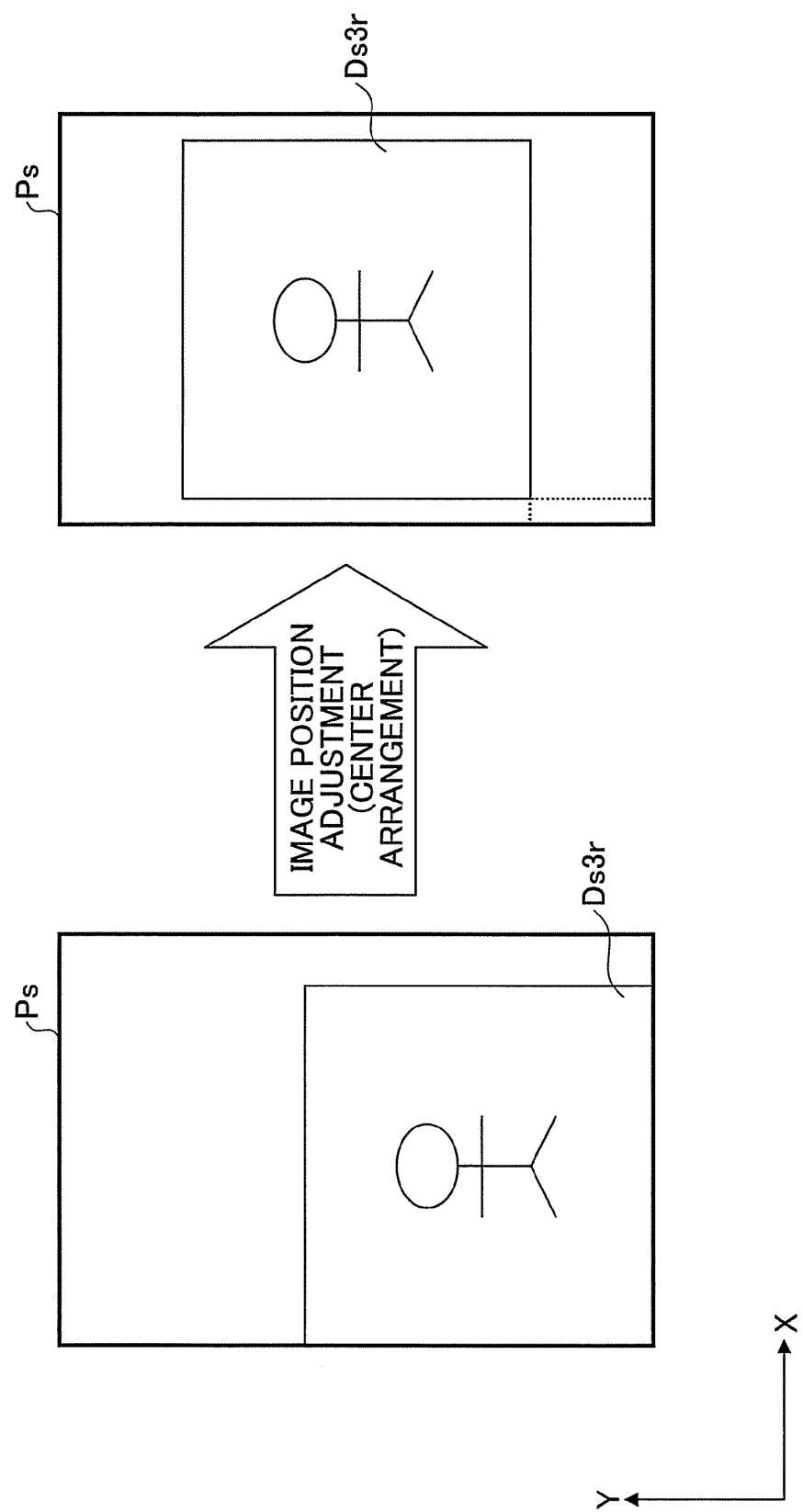

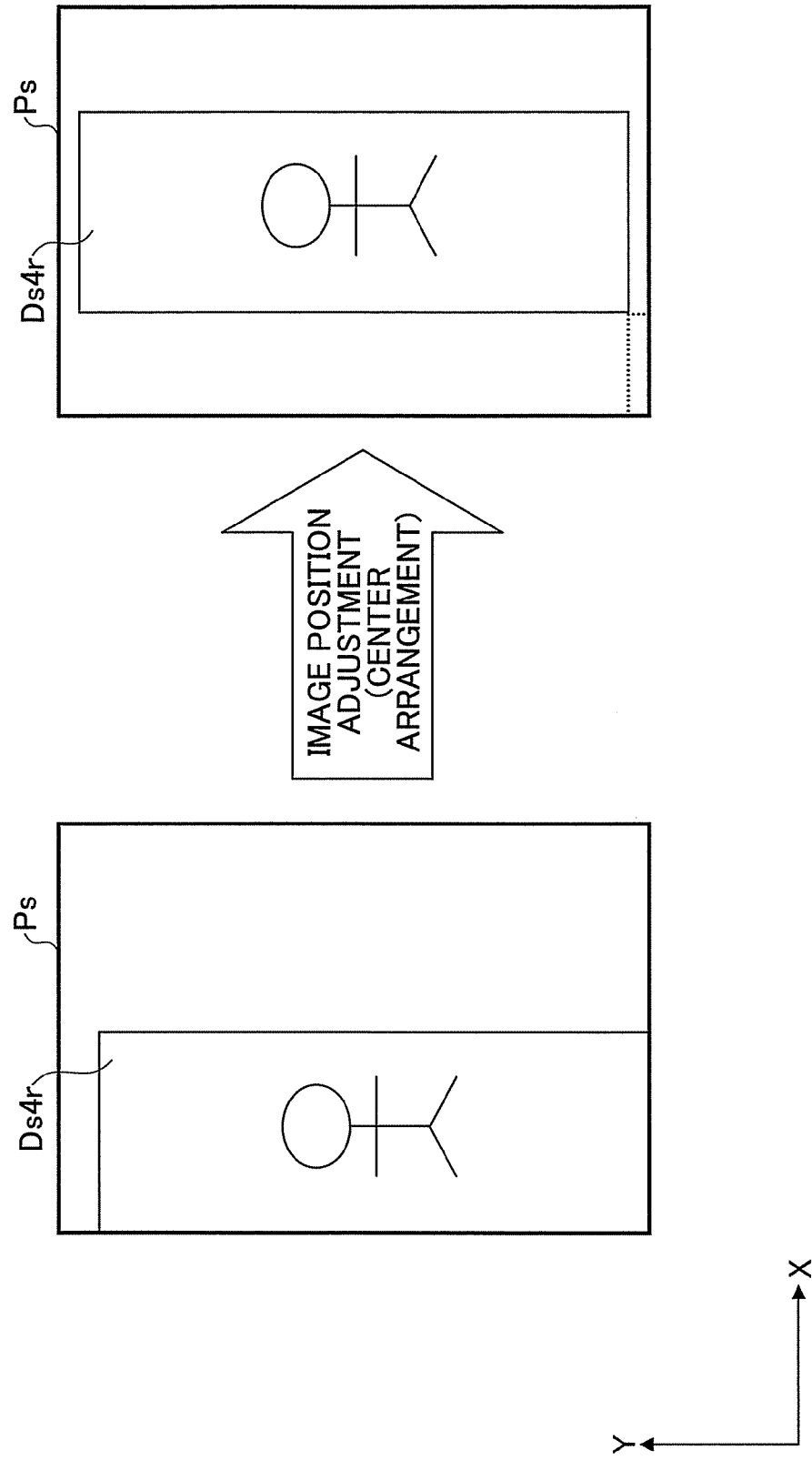

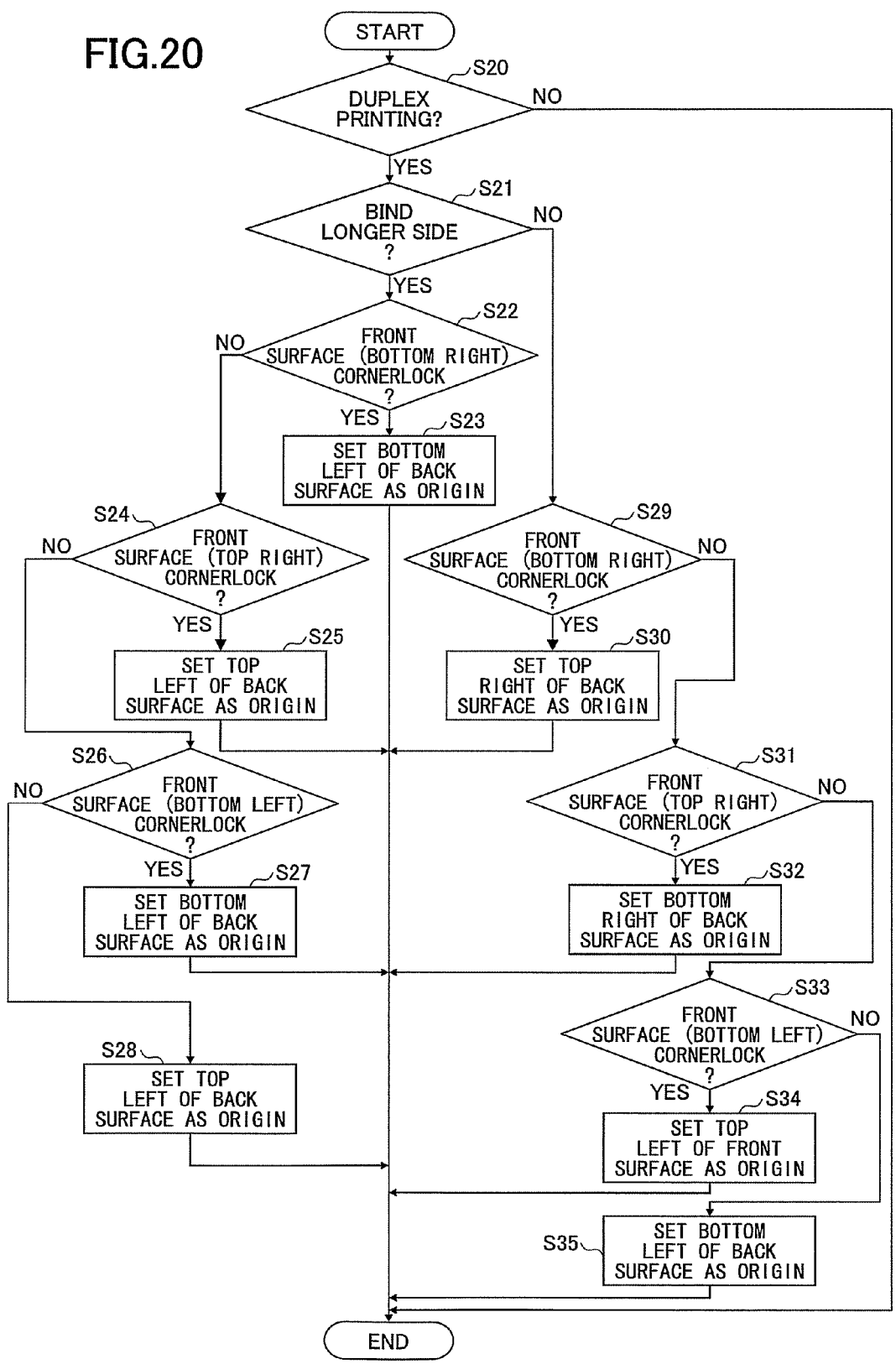

IMAGE FORMING APPARATUS, METHOD, AND COMPUTER PRODUCT FOR POSITIONING IMAGES OF DIFFERENT SIZE ON A GIVEN PAPER SIZE

CROSS-REFERENCE TO RELATED APPLICATIONS

This application is based upon and claims the benefit of priority of the prior Japanese Patent Application No. 2009-062054, filed on Mar. 13, 2009, the entire contents of which are incorporated herein by reference.

BACKGROUND OF THE INVENTION

1. Field of the Invention

The present invention generally relates to image forming apparatuses, image forming methods, and computer-readable storage media that store a program which, when executed by a computer, causes the computer to perform a process in accordance with the image forming method.

2. Description of the Related Art

Conventionally, when a Portable Document Format (PDF) direct printing is performed using pre-punched paper, an image may be printed in a region corresponding to holes in the paper and cause a portion of the image to drop out at the holes. For this reason, the image to be printed is subjected to a processing such as reduction, in order to adjust a print position of the image on the paper.

For example, a Japanese Laid-Open Patent Publication No. 7-314843 proposes a method of printing the image that is adjusted to fit within the area of the paper, by preparing a plurality of rectangular graphic data representing printing regions. This proposed method derives a magnification or reduction with which output information that is edited for a predetermined paper size is to be printed within a paper size based on the selected rectangular graphic data.

However, when images of different document sizes are to be printed on the same paper size according to the proposed method described above, even if it is possible to derive the magnifications for the images of the different document sizes in order to print the images within a certain paper size, it is impossible to print the images by adjusting the position of each image to a central area of the paper having the certain paper size.

In other words, in order to arrange the position of each of the images of different document sizes to the central area of the paper having the certain paper size, it is necessary to compute image adjusting parameters for arranging the image to the central area of the paper, and to input a moving amount of the image by a printer driver, for each print job. As a result, the proposed method described above may not be convenient for use by a general user.

Next, a description will be given of an example of a conventional print position adjusting method, by referring to FIGS. 1 through 5.

FIG. 1 is a diagram illustrating images of different document sizes Ds1 and Ds2 with respect to a predetermined paper size Ps. As illustrated in FIG. 1, in order to print the images of the different document sizes Ds1 and Ds2 to fit within the area of the paper having the predetermined paper size Ps, the user in this example must input the reduction of each of the images of the different document sizes Ds1 and Ds2 and the moving amount of the images to adjust the position of each image to the central area of the paper having the predetermined paper size Ps, for each print job.

FIG. 2 is a diagram illustrating the images of the different document sizes Ds1 and Ds2 that are reduced by the same reduction. FIG. 3 is a diagram illustrating a reduced image Ds1r of the document size Ds1 adjusted by a certain moving amount to a central area of the paper having the predetermined paper size Ps, and a reduced image Ds2r of the document size Ds2 adjusted by the same certain moving amount as the reduced image Ds1r.

In FIG. 2, the user inputs the reductions of the images of the different document sizes Ds1 and Ds2 so that the reduced images Ds1r and Ds2r fit within the predetermined paper size Ps. Then, the user computes the certain moving amount or, parameters, for adjusting the position of the reduced image Ds1r to the central area of the paper having the predetermined paper size Ps. However, if the certain moving amount that is computed for the reduced image Ds1r is also used with respect to the reduced image Ds2r, the reduced image Ds2r will not fit within the predetermined paper size P2, and an image portion Ds2d indicated by hatchings in FIG. 3 will drop out from the printed image on the paper.

Accordingly, when the same setting related to the magnification or reduction and the moving amount is used with respect to all of the print jobs, a portion of the image may drop out and not be printed on the paper, depending on the document size. For this reason, when printing the images having different document sizes while centering the images to the central portion of the paper, the user must carry out a troublesome operation of computing the moving amount of the image for achieving the centering of the image, and setting the computed moving amount, with respect to each print job.

FIG. 4 illustrates an example where the reduced image Ds1r is moved to the central area of the predetermined paper size P2 by the centering. As may be seen from FIG. 4, the user must compute the moving amount of the reduced image Ds1r, including a position adjusting length x1 in an X-axis direction and a position adjusting length y1 in a Y-axis direction using a bottom left corner of the predetermined paper size Ps as the origin, and perform a positional adjustment of the reduced image Ds1r based on the computed moving amount, in order to arrange the reduced image Ds1r to the central area of the predetermined paper size Ps.

FIG. 5 illustrates an example where the reduced image Ds2r is moved to the central area of the predetermined paper size P2 by the centering. As may be seen from FIG. 5, the user must compute the moving amount of the reduced image Ds2r, including a position adjusting length x2 in the X-axis direction and a position adjusting length y2 in the Y-axis direction using a bottom left corner of the predetermined paper size Ps as the origin, and perform a positional adjustment of the reduced image Ds2r based on the computed moving amount, in order to arrange the reduced image Ds2r to the central area of the predetermined paper size Ps.

SUMMARY OF THE INVENTION

Accordingly, it is a general object of the present invention to provide a novel and useful image forming apparatus, image forming method and computer-readable storage medium, in which the problems described above are suppressed.

Another and more specific object of the present invention is to provide an image forming apparatus, an image forming method and a computer-readable storage medium, which print images of different document sizes at desired positions on a recording medium such as paper, without considerably increasing the load on the user.

According to one aspect of the present invention, there is provided an image forming apparatus configured to print images of different document sizes on paper having a predetermined paper size, comprising a computation processing part configured to compute a print position of the image with respect to the paper, based on the document size, the paper size and moving amount computation information that is input thereto; and a print processing part configured to arrange and print the image on the paper, based on the print position computed by the computation processing part.

According to one aspect of the present invention, there is provided an image forming method for printing images of different document sizes on paper having a predetermined paper size, comprising computing a print position of the image with respect to the paper, based on the document size, the paper size and moving amount computation information that is input thereto; and arranging and printing the image on the paper, based on the print position that is computed by the computing.

According to one aspect of the present invention, there is provided a computer-readable storage medium that stores a program which, when executed by a computer, causes the computer perform an image forming process including printing images of different document sizes on paper having a predetermined paper size, said image forming process comprising a computation processing procedure to compute a print position of the image with respect to the paper, based on the document size, the paper size and moving amount computation information that is input thereto; and a print processing procedure to arrange and print the image on the paper, based on the print position computed by the computation processing procedure.

Other objects and further features of the present invention will be apparent from the following detailed description when read in conjunction with the accompanying drawings.

BRIEF DESCRIPTION OF THE DRAWINGS

FIG. 10 is a diagram for explaining an example of a corner position assignment in response to the image position adjusting command in PJL;

FIG. 14 is a diagram illustrating an example where the images of different document sizes reduced by a % are moved to a top right portion of the paper;

FIG. 17 is a diagram illustrating an example of an image position adjustment which arranges the image of one of the different document sizes in FIG. 16 to the central area of the paper;

FIG. 18 is a diagram illustrating an example of the image position adjustment which arranges the image of the other of the different document sizes in FIG. 16 to the central area of the paper;

FIG. 20 is a flow chart for explaining the back surface adjustment in the duplex printing.

DESCRIPTION OF THE PREFERRED EMBODIMENTS

A description will be given of embodiments of an image forming apparatus, an image forming method and a computer-readable storage medium according to the present invention, by referring to FIGS. 6 through 20.

[Structure of Printing System]

Figure 1:
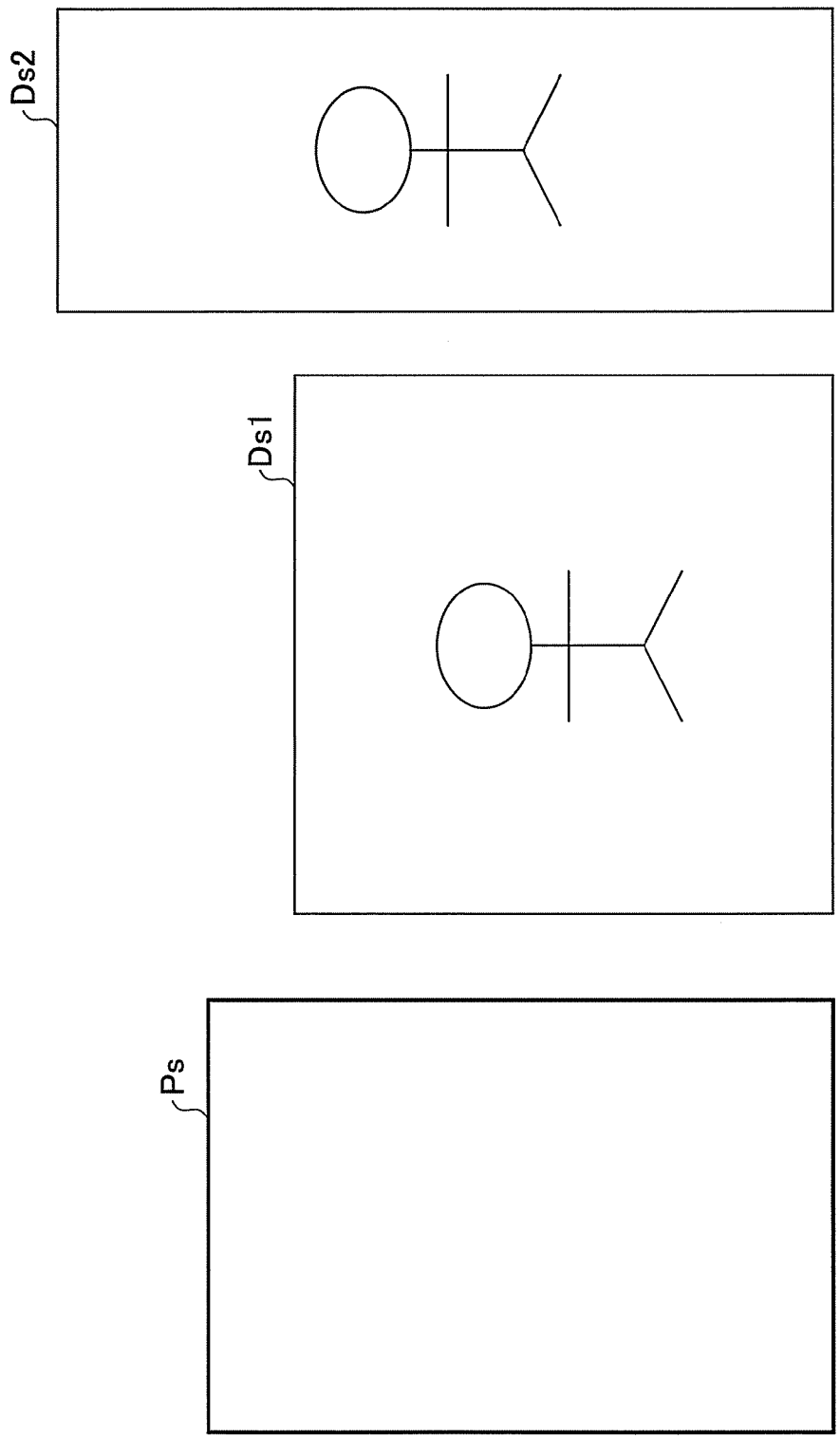
FIG. 1 is a diagram illustrating images of different document sizes with respect to a predetermined paper size.
Figure 2:
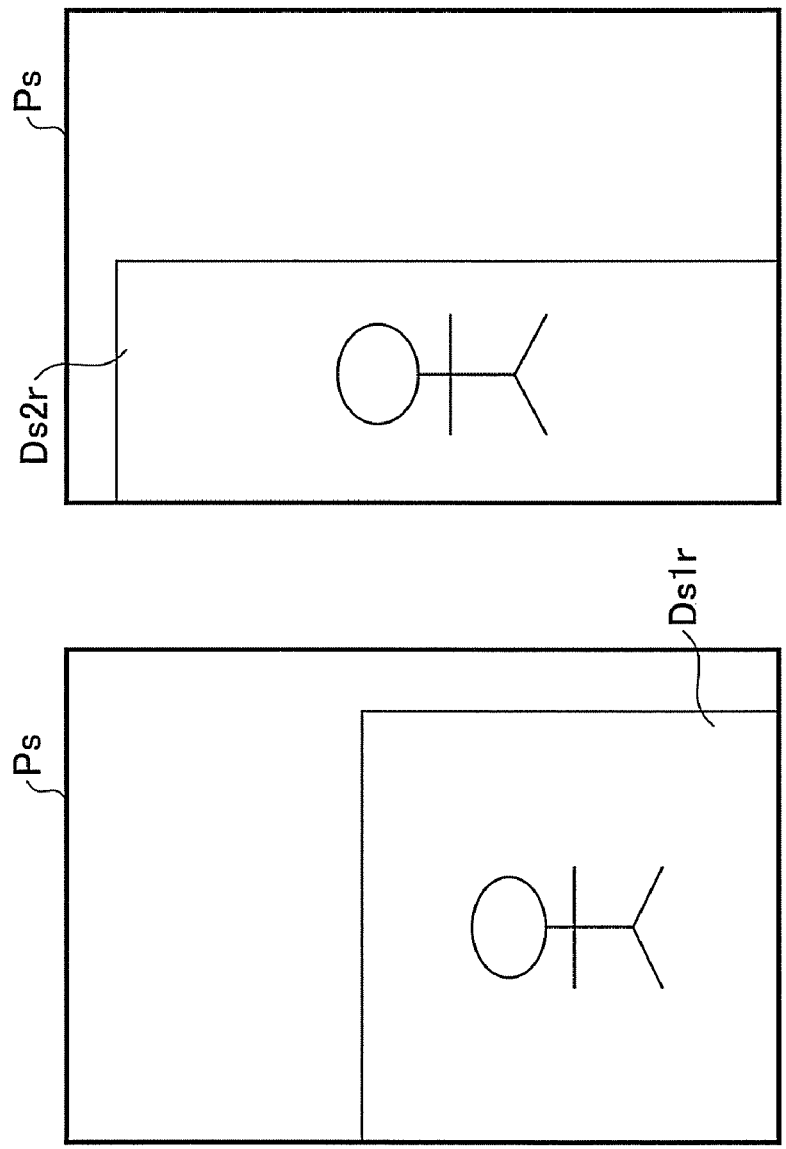
FIG. 2 is a diagram illustrating images of the different document sizes that are reduced by the same reduction.
Figure 3:
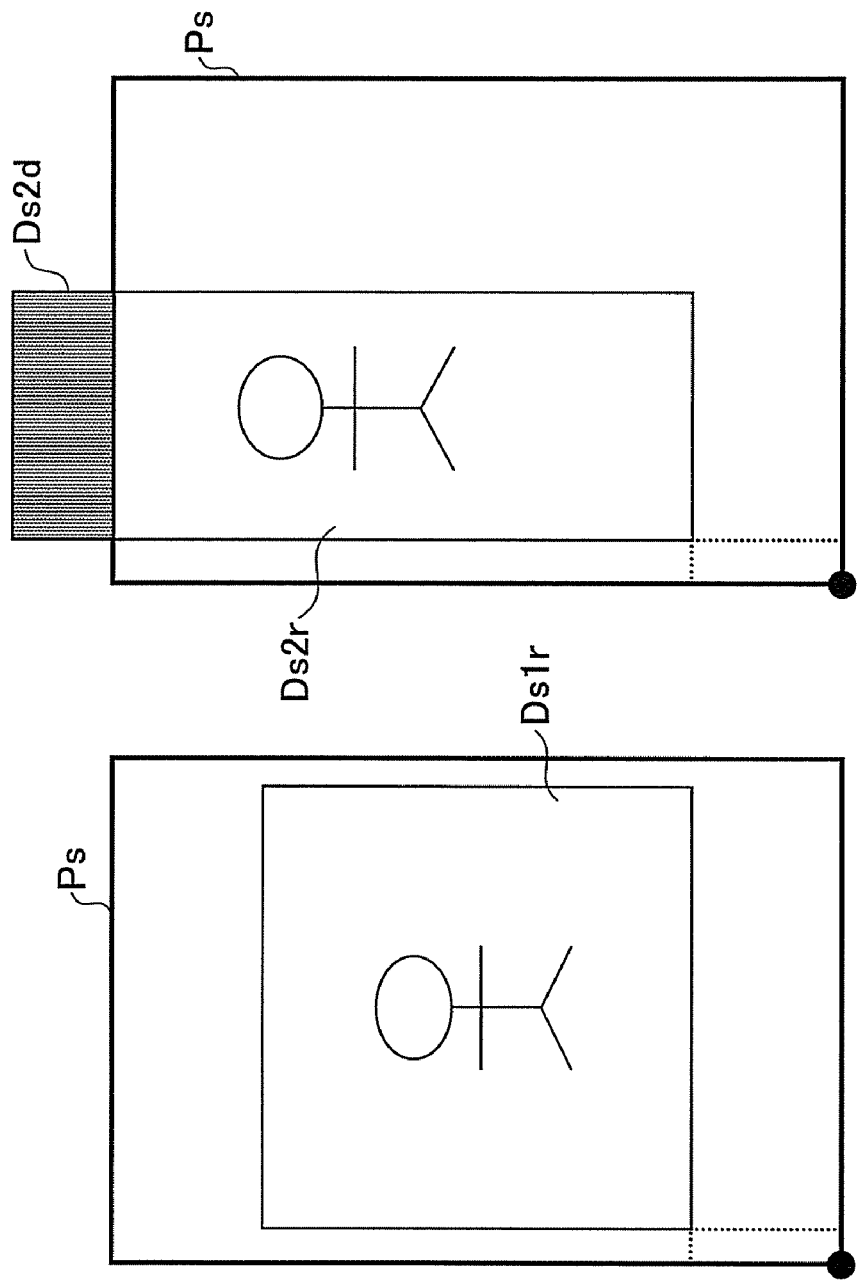
FIG. 3 is a diagram illustrating a reduced image adjusted to a central area of the paper by a certain moving amount, and another reduced image adjusted by the certain moving amount.
Figure 4:
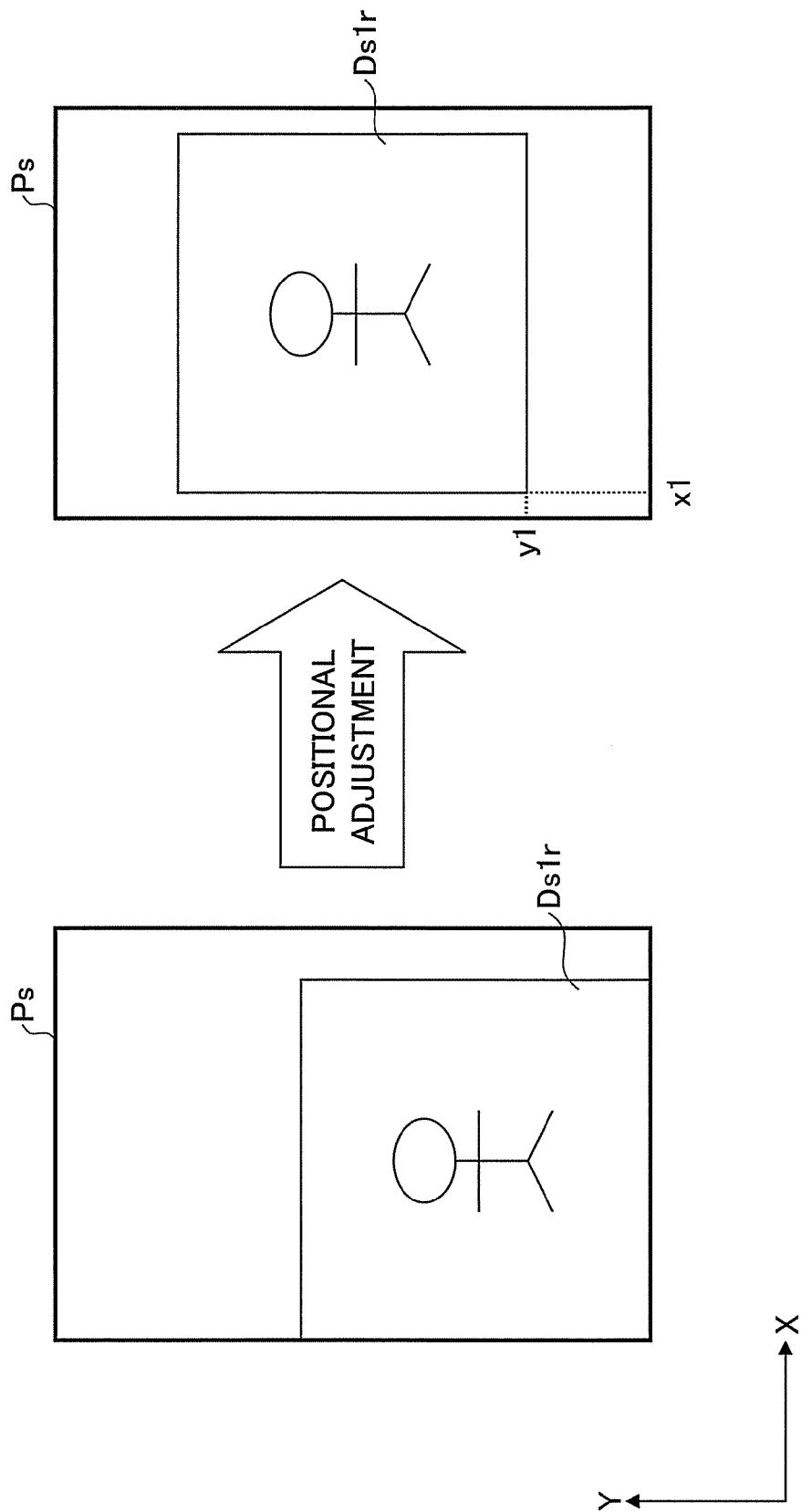
FIG. 4 illustrates an example where the reduced image is moved to the central area of the predetermined paper size by a centering.
Figure 5:
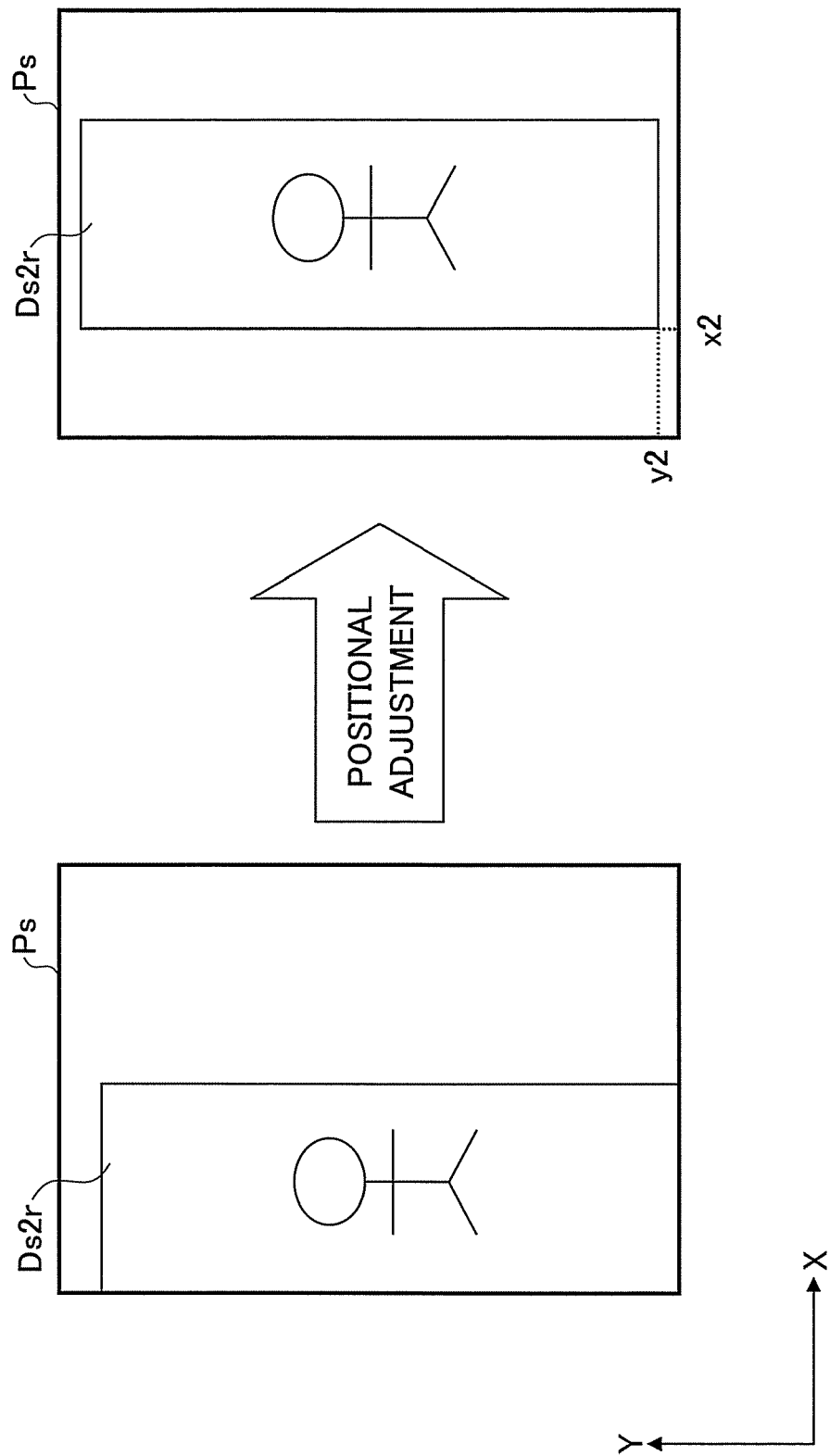
FIG. 5 illustrates an example where another reduced image Ds1r is moved to the central area of the predetermined paper size by the centering.
Figure 6:
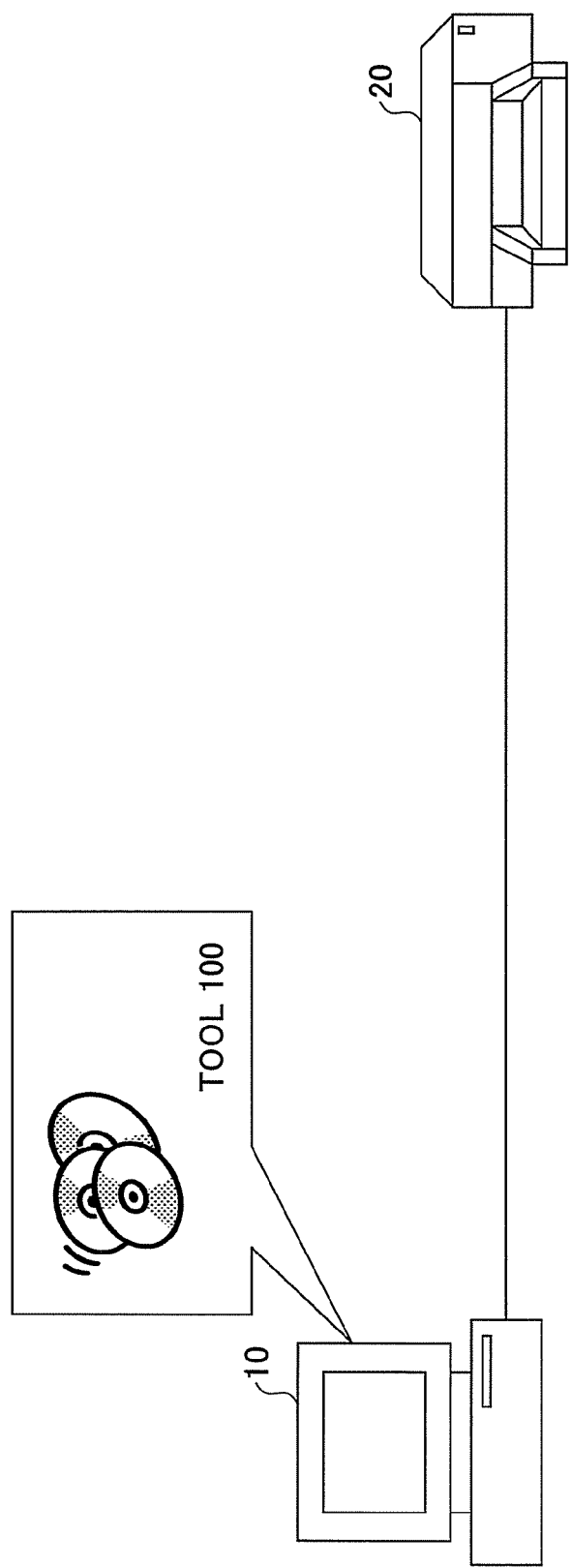
FIG. 6 is a diagram illustrating a structure of a printing system in an embodiment of the present invention.

FIG. 6 is a diagram illustrating a structure of a printing system in an embodiment of the present invention. As illustrated in FIG. 6, the printing system includes a client Personal Computer (PC) 10 and an image forming apparatus 20, such as a printer, that are connected via a network. A PDF direct printing tool 100 is installed in the client PC 10.

The client PC 10 can directly transfer a PDF file to the image forming apparatus 120 by the PDF direct printing tool 100, without having to use a printer driver. The image forming apparatus 20 subjects data of the PDF file transferred from the client PC 10 to a processing such as rendering, and prints the processed data.

[Functional Blocks]

Figure 7:
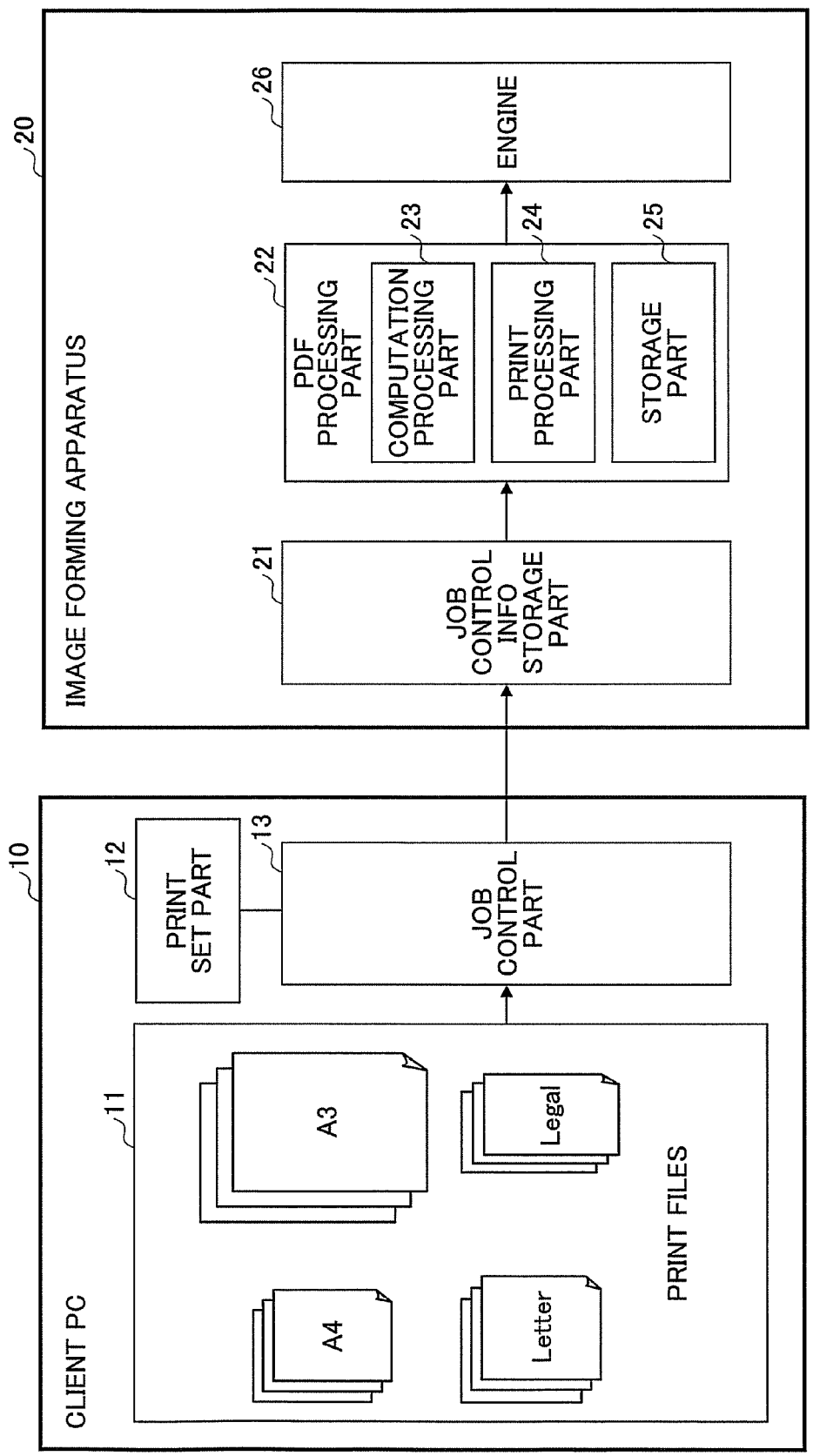
FIG. 7 is a functional block diagram for explaining an image forming apparatus in the embodiment of the present invention.

Next, a description will be given of functional blocks of the printing system of this embodiment, by referring to FIG. 7. FIG. 7 is a functional block diagram for explaining the image forming apparatus 10 in the embodiment of the present invention.

The client PC 10 illustrated in FIG. 7 forms a computer terminal that is used by a user to generate print data to be printed and to issue a print instruction or the like. The client PC 10 includes a display part for displaying the print instruction, a print file and the like, and an input device, such as a keyboard and a mouse, for inputting the print instruction and selecting the print file. The client PC 10 also includes a Central Processing Unit (CPU) and an internal storage unit, such as a hard disk drive, a Random Access Memory (RAM), and a Read Only Memory (ROM). For example, the internal storage unit of the client PC 10 stores print files 11 to be subjected to the PDF direct printing. In addition, the CPU of the client PC 10 forms a print set part 12 and a job control part 13. The print set part 12 may include the input device and the display part of the client PC 10.

The print files 11 include print jobs of a plurality of different document sizes, such as A4 size, A3 size, Letter size, and Legal size, created from the PDF file. Information indicating the document size of each print job is added when the PDF file is created.

The print set part 12 sets printing contents and the like of the print job in the print files 11 that is executed when the input, instruction and the like are made from the user. More particularly, the print set part 12 sets the paper size, the magnification (or scale) with which the image of the print job is to be printed on paper, the arranging position (or layout) of the image of the print job to be printed on paper, a corner position that is used as a reference when setting the print position of the image of the print job to be printed on paper (for example, corner setting), and a margin amount at the corner position when printing the image of the job on paper.

The magnification, the corner position and the margin amount that are set by the print set part 12 are used by a PDF processing part 22 of the image forming apparatus 20 as moving amount computation information, when printing a target image of the print job on the paper having the set paper size at the set arranging position (or layout).

The job control part 13 adds a Printer Job Language (PJL) command with respect to each print job of the print files 11, based on the print contents set by the print set part 12. The PJL command added to each print job instructs the image forming apparatus 20 to adjust the image position and to move the image within the paper size. The PJL is a known and generally employed command language, developed by Hewlett-Packard Company, that is provided to control various functions of the image forming apparatus 20 that forms the printer or the like.

The image forming apparatus 20 illustrated in FIG. 7 performs the PDF direct printing based on the print instruction from the client PC 10. The image forming apparatus 20 includes a job control information storage part 21, the PDF processing part 22, and an engine 26.

The job control information storage part 21 stores job control information for controlling the print job that is instructed from the client PC 10, based on the PJL command that is added by the job control part 13 of the client PC 10.

The PDF processing part 22 includes a computation processing part 23, a print processing part 24, and a storage part 25. The PDF processing part 22 converts the print files 11 into PostScript commands, subjects the image of each print job to a processing including the positional adjustment, and stores a bit-map of the image in a page memory formed by the storage part 25. The PostScript command that is obtained by the conversion may include a PostScript command that includes the document size.

The computation processing part 23 performs a computation processing procedure to compute the print position for printing the image of each print job on the paper, based on the moving amount computation information of the print job set in the client PC 10 that is interpreted from the job control information stored in the job control information storage part 21, the size of the paper on which each print job is to print the image, and the document size of the image to be printed by the print job. A method of computing the print position of the image with respect to the paper will be described later in the specification.

The print processing part 24 performs a print processing procedure to adjust the position of the image to be printed by each print job, based on the print position computed by the print processing part 24.

The print processing procedure of the print processing part 24 also adjusts the image position of each print job, based on the print position that is computed by the computation processing part 23, and stores the bit-map of the image whose position has been adjusted with respect to the paper in the page memory formed by the storage part 25.

The storage part 25 also stores tables, including a table that is referred to by the computation processing part 23 when computing the print position of the image of the print job to be printed on the paper, and a table that is referred to by the computation processing part 23 when computing the print position in response to a print instruction for binding (or stapling) the longer side or the shorter side of the paper in a duplex printing.

The engine 26 prints on a recording medium, such as paper, the image (or image data) of each print job subjected to the processing in the print processing part 24 and stored in the page memory formed by the storage part 25 in the form of the bit-map.

[Hardware Structure of Image Forming Apparatus]

Figure 8:
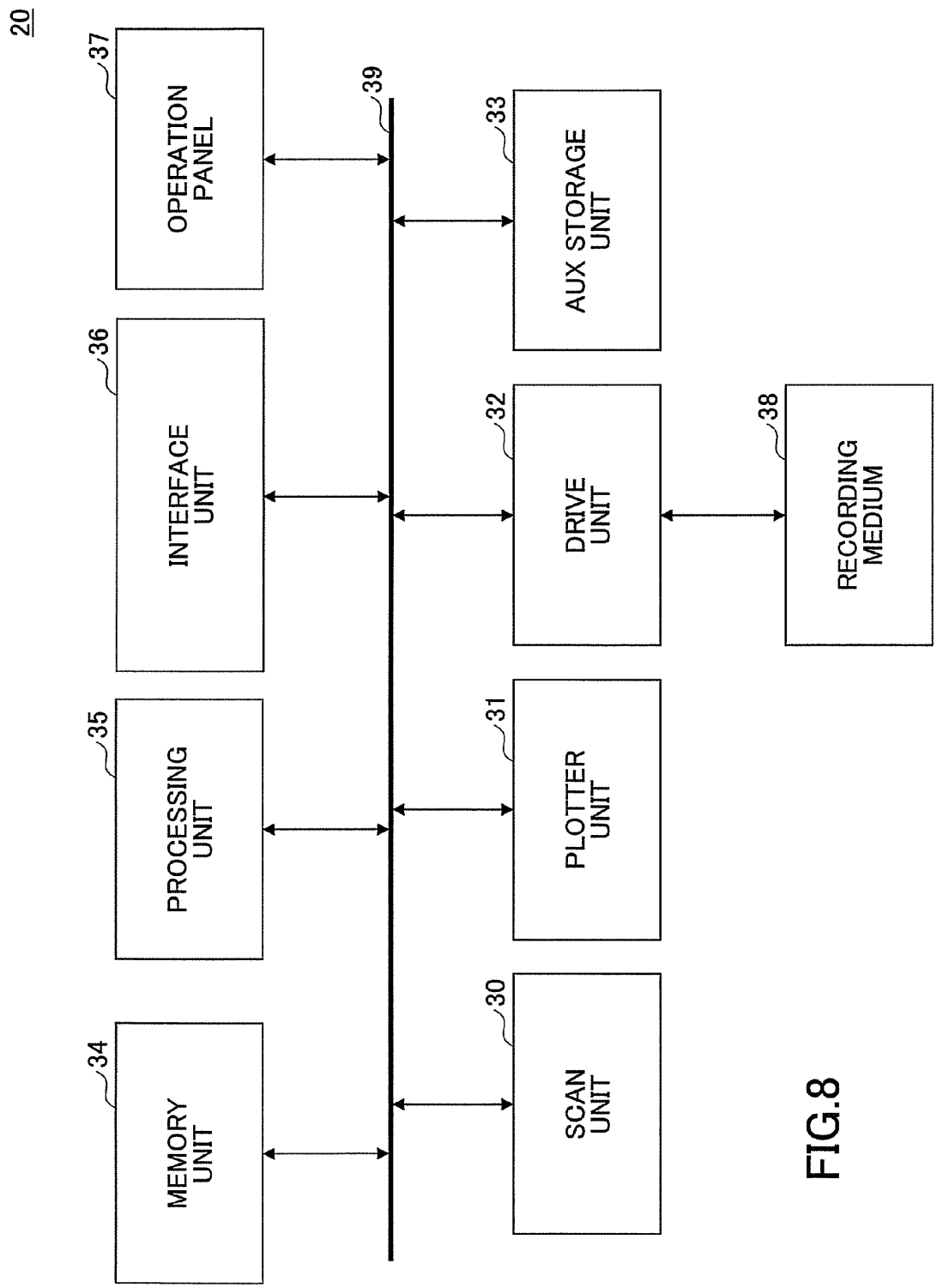
FIG. 8 is a block diagram illustrating an example of a hardware structure of the image forming apparatus.

A description will now be given of an example of a hardware structure of the image forming apparatus 20, by referring to FIG. 8. FIG. 8 is a block diagram illustrating the example of the hardware structure of the image forming apparatus 20. In this example, the image forming apparatus 20 is formed by a Multi-Function Peripheral (MFP) that has a plurality of functions that may include a copy function, a scan function, a facsimile communication (transmission and reception) function, and a print function.

The image forming apparatus 20 illustrated in FIG. 8 includes a scan unit 30, a plotter unit 31, a drive unit 32, an auxiliary storage unit 33, a memory unit 34, a processing unit (or operation processing unit) 35, an interface unit 36, and an operation panel 37 that are connected via a bus 39.

The scan unit 30 includes a scanner engine and an engine control part for controlling the scanner engine, and is configured to scan a document and output image data of the scanned document. The plotter unit 31 includes a plotter engine and an engine control part for controlling the plotter engine, and is configured to output the image data by plotting the image of the image data on the recording medium such as paper. The interface unit 36 is formed by a modem, a LAN card or the like, and is configured to connect the image forming apparatus 20 to a network.

The image forming apparatus 20 transmits information to and receives information from other apparatuses, such as the client PC 10 connected to the network, via the interface unit 36. The operation panel 37 is formed by a touch panel or the like that forms an input device and a display part. The operation panel 37 displays operation keys of the image forming apparatus 20 that are manipulated by the user, and statuses of processes performed in the image forming apparatus 20.

Various programs for controlling the image forming apparatus 20 may be installed in the image forming apparatus 20. The various programs include an image forming program which, when executed by a computer such as the processing unit 35, causes the computer to perform an image forming process in accordance with the image forming method in this embodiment of the present invention. The image forming program may be stored in the recording medium 38 that is distributed or, may be downloaded from the network via the interface unit 36. The image forming program that is downloaded may be stored in the auxiliary storage unit 33.

The recording medium 38 which stores the image forming program may be formed by any suitable computer-readable storage medium which stores the image forming program optically, electrically or magnetically. Examples of the compute-readable storage medium include Compact Disc Read Only Memories (CD-ROMs), flexible disks, magneto-optical disks, and semiconductor memory devices. The semiconductor memory devices include ROMs, flash memories and the like.

In this example, when the recording medium 38 that stores the image forming program is loaded into the drive unit 32, it is assumed for the sake of convenience that the image forming program is installed from the recording medium 38 into the auxiliary storage unit 33 via the drive unit 32. On the other hand, it is assumed for the sake of convenience that the image forming program downloaded from the network is installed into the auxiliary storage unit 33 via the interface unit 36.

The auxiliary storage unit 33 stores the image forming program that is installed, and also stores files, data and the like that are necessary. When starting the image forming apparatus 20 (or the processing unit 35), the image forming program read from the auxiliary storage unit 33 is stored in the memory unit 34. The processing unit 35 performs various processes, including the computation process of the computation processing part 23 of the PDF processing part 22, in accordance with the image forming program stored in the memory unit 34.

[Image Position Adjusting Command by PJL]

Next, a description will be given of the PJL command that is added in the job control part 13 of the client PC 10 in order to make the image position adjustment based on the user settings.

Figure 9:
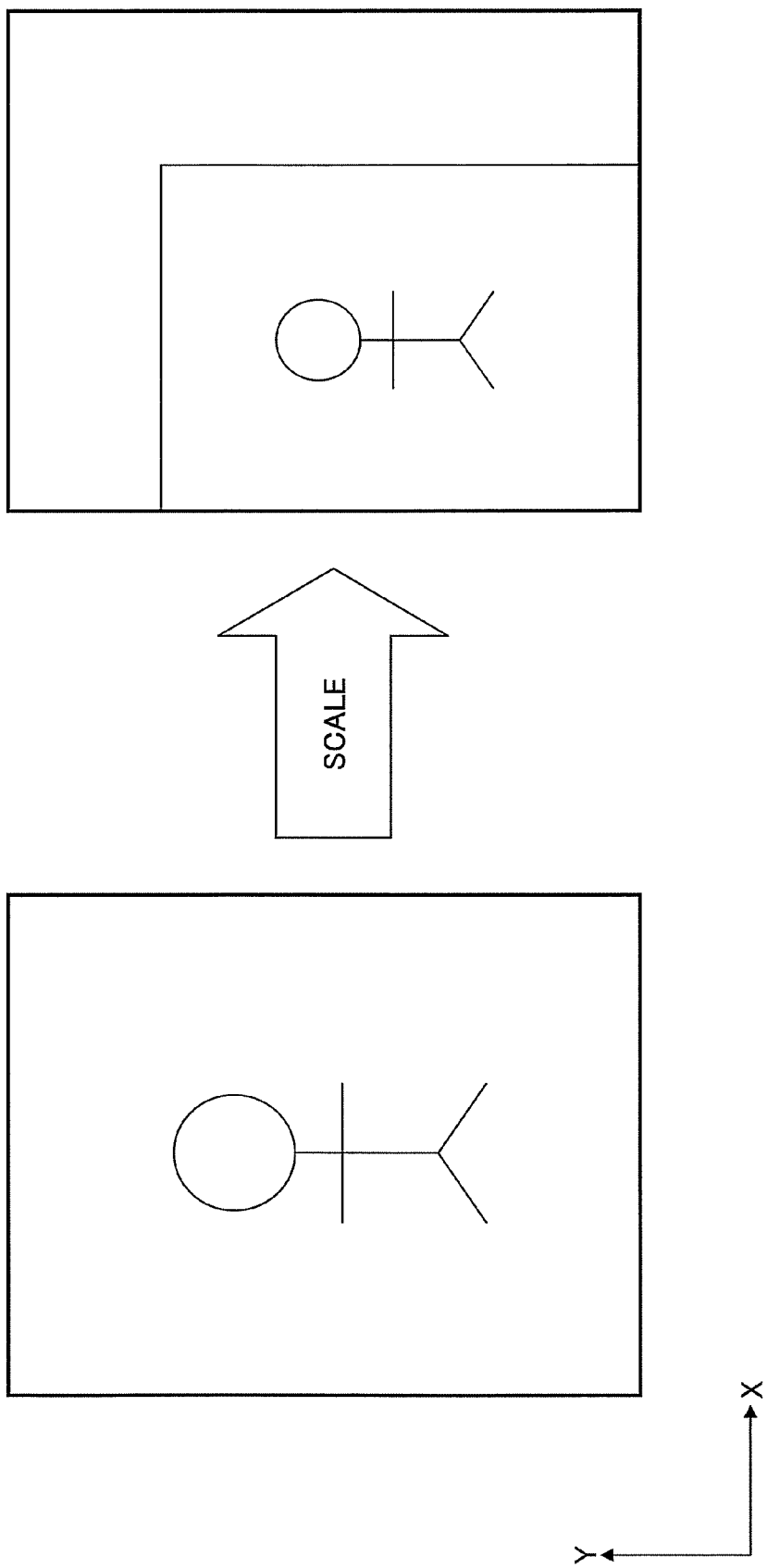
FIG. 9 is a diagram for explaining an example of an image reduction in response to an image position adjusting command in Printer Job Language (PJL)

FIG. 9 is a diagram for explaining an example of an image reduction (SCALE) in response to an image position adjusting command in PJL. The image position adjusting command in PJL for the image reduction (SCALE) is added to the print job based on a reduction in an input range of 0.1% to 100.0% that is input by the user. When the user inputs a reductional with respect to the image of the print job as illustrated in FIG. 9, a command with the reductional is added to the print job as the PJL command, and the image of the print job is reduced based on this PJL command.

FIG. 10 is a diagram for explaining an example of a corner position assignment (or CORNERLOCK) in response to the image position adjusting command in PJL. The image position adjusting command in PJL for the corner position assignment (or CORNERLOCK) is added to the print job based on the arranging position (or layout) that is input by the user and is used as a reference when setting the print position of the image to be printed on the paper. The arranging position (or layout) includes the corner position of the paper at the bottom right, the top right, the bottom left and the top left, the center position of the paper, and the like. As illustrated in FIG. 10, when the user inputs the center position (CENTER) as the arranging position (layout), for example, the image position adjusting command in PJL is added to the print job, and the image of the print job is printed based on the image position adjusting command in PJL so that the image is arranged at the center position of the paper.

FIGS. 11A through 11D are diagrams for explaining an example of an image moving amount in response to the image position adjusting command in PJL. The image position adjusting command in PJL for the image moving amount is added to the print job based on an image moving amount (VERTICALMARGIN) in the X-axis direction (horizontal direction or, rightward and leftward directions) and an image moving amount (HORIZONTALMARGIN) in the Y-axis direction (vertical direction or, upward and downward directions, perpendicular to the horizontal direction) that are input by the user and are used amounts of margin at the position of the corner position assignment. It is a precondition that the image position adjusting command in PJL for the image moving amount is used together with the image position adjusting command in PJL for the corner position assignment (CORNERLOCK) described above in conjunction with FIG. 10. If the user inputs the center position (CENTER) as the arranging position (layout) with respect to the image position adjusting command in PJL for the corner position assignment (CORNERLOCK), the image position adjusting command in PJL for the image moving amount is invalidated.

Based on the image position adjusting command in PJL for the image moving amount, the image of the print job is moved by the image moving amount in the X-axis direction and the image moving amount in the Y-axis direction using, as the origin, the position of the corner position assignment on the paper on which the image of the print job is to be printed.

For example, when the image of the print job has a rectangular shape and is moved by regarding the assigned corner position of the paper as the origin, the assigned corner position of the paper and the corner position of the rectangular image of the print job are matched, and the rectangular image of the print job is thereafter moved in the X-axis direction and the Y-axis direction with reference to the origin. When the bottom left corner of the paper is regarded as the origin, for example, the image position adjusting command adds a positive sign "+" to the image moving amount towards the rightward direction along the X-axis direction, and adds a positive sign "+" to the image moving amount towards the upward direction along the Y-axis direction.

In this embodiment, measures are taken so that the user does not need to be aware of the sign to be added to the image moving amount with reference to the bottom left corner of the paper that is regarded as the origin, in order to improve the operation ease and efficiency. For example, setting screens illustrated in FIGS. 11A through 11D displayed on the display part of the client PC 10 may be used to assign (or specify) the corner position of the paper, and to input the image moving amount as the amount of margin at the corner position.

Figure 11A:
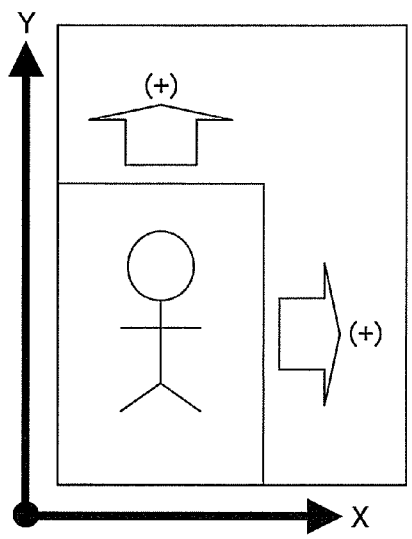
FIGS. 11A through 11D are diagrams for explaining an example of an image moving amount in response to the image position adjusting command in PJL.

FIG. 11A illustrates a case (CORNERLOCK "BOTTOMLEFT") where the user assigns the "bottom left" as the corner position. In this case, the sign to be added to the amount of margin (or image moving amount) may be displayed on the setting screen as being the positive sign "+" in the rightward direction along the X-axis direction indicated by an arrow, and as being the positive sign "+" in the upward direction along the Y-axis direction indicated by an arrow in FIG. 11A.

Figure 11B:
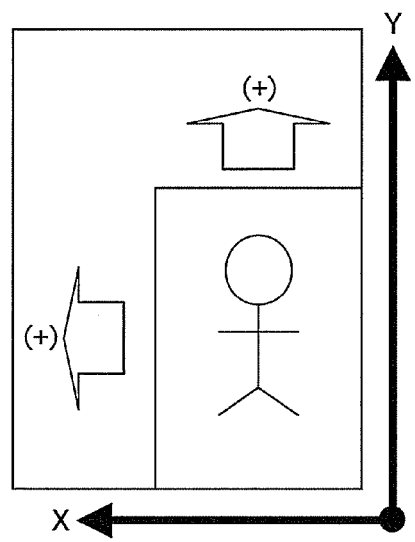

FIG. 11B illustrates a case (CORNERLOCK "BOTTOMRIGHT") where the user assigns the "bottom right" as the corner position. In this case, the sign to be added to the amount of margin (or image moving amount) may be displayed on the setting screen as being the positive sign "+" in the leftward direction along the X-axis direction indicated by an arrow, and as being the positive sign "+" in the upward direction along the Y-axis direction indicated by an arrow in FIG. 11B.

Figure 11C:
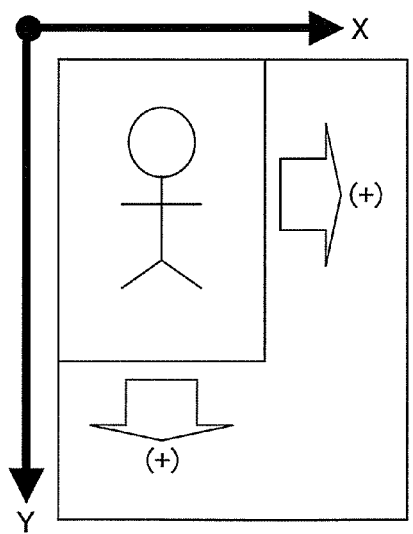

FIG. 11C illustrates a case (CORNERLOCK "TOPLEFT") where the user assigns the "top left" as the corner position. In this case, the sign to be added to the amount of margin (or image moving amount) may be displayed on the setting screen as being the positive sign "+" in the rightward direction along the X-axis direction indicated by an arrow, and as being the positive sign "+" in the downward direction along the Y-axis direction indicated by an arrow in FIG. 11C.

Figure 11D:
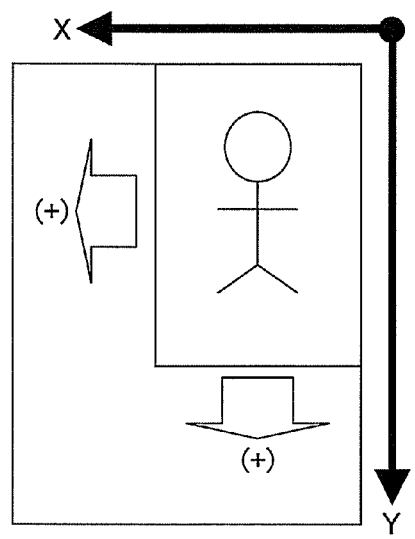

FIG. 11D illustrates a case (CORNERLOCK "TOPRIGHT") where the user assigns the "top right" as the corner position. In this case, the sign to be added to the amount of margin (or image moving amount) may be displayed on the setting screen as being the positive sign "+" in the leftward direction along the X-axis direction indicated by an arrow, and as being the positive sign "+" in the downward direction along the Y-axis direction indicated by an arrow in FIG. 11D.

[Computation Process of Computation Processing Part 23]

Figure 12:
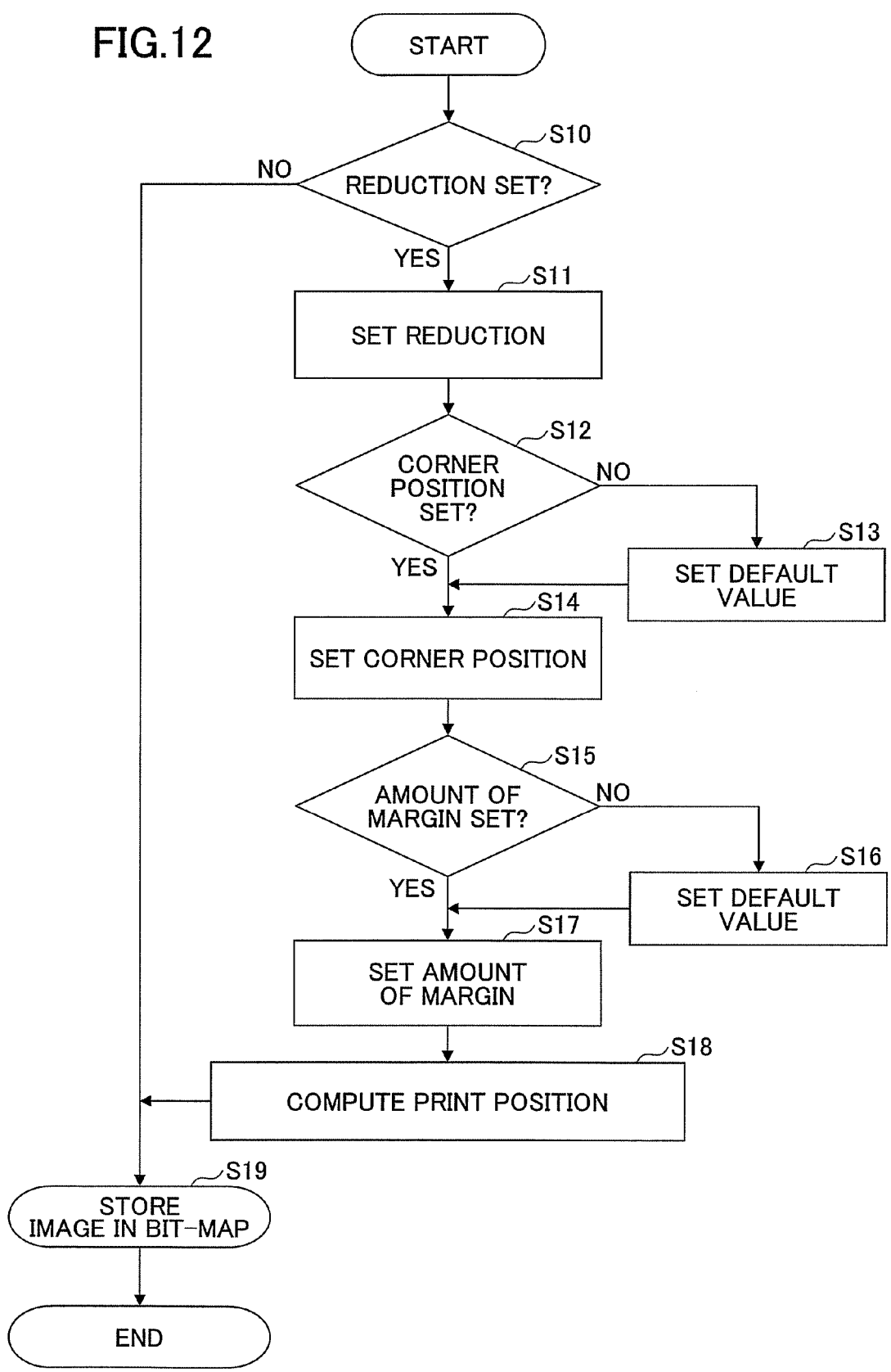
FIG. 12 is a flow chart for explaining a computing process of a computation processing part.

Next, a description will be given of the computation process of the computation processing part 23 of the PDF processing part 22 within the image forming apparatus 20, by referring to FIG. 12. FIG. 12 is a flow chart for explaining the computing process of the computation processing part 23.

In a step S10 illustrated in FIG. 12, the computation processing part 23 of the PDF processing part 22 within the image forming apparatus 20 judges whether the reduction (SCALE) of the image has been set, based on the job control information stored in the job control information storage part 21. If the judgement result in the step S10 is YES, the computation processing part 23 sets the reduction (SCALE) that has been set as the reduction of the moving amount computation information used in the computation process, in a step S11.

In a step S12, the computation processing part 23 judges whether the corner position (CORNERLOCK) has been set. If the judgement result in the step S12 is NO, the computation processing part 23 sets a default value that has been set in advance (or preset), such as the top right corner, as the corner position, in a step S13. On the other hand, if the judgement result in the step S12 is YES or after the step S13, the computation processing part 23 sets the corner position (CORNERLOCK) that has been set as the corner position of the moving amount computation information, in a step S14.

Next, in a step S15, the computation processing part 23 judges whether the amount of margin (MARGIN) has been set. If the judgement result in the step S15 is NO, the computation processing part 23 set a default value "0 (zero)" or the like in a step S16. On the other hand, if the judgement result in the step S15 is YES or after the step S16, the computation processing part 23 sets the amount of margin (MARGIN) that has been set as the image moving amount of the moving amount computation information.

In a step S18, the computation processing part 23 computes the print position of the image of the print job with respect to the paper, based on the set values set in the steps S11, S14 and S17 and the paper size of the paper on which the image of the print job is to be printed.

If the judgement result in the step S10 is NO or after the step S18, the print processing part 24 stores the image of the print job in the page memory formed by the storage part 25 in the form of the bit-map based on the print position computed in the step S18, in a step S19, and the process ends.

If the reduction is set to "100%" in the step S11, the step S18 computes the print position based on the corner position set in the step S14 and the amount of margin (or image moving amount) set in the step S17.

In addition, the step S12 may be performed prior to the step S10, and the step S15 may be performed prior to the step S12. In other words, the order in which the steps S10, S12 and S15 are performed is not limited to the order illustrated in FIG. 12.

Furthermore, the set values set in the steps S11, S14 and S17 are input by the user from the client PC 10.

[Examples of Assigned Corner Positions]

Next, a description will be given of examples of the computation process of the computation processing part 23 for cases where the user assigns the "top right" and "center" as the corner position of the image of the print job.

Figure 15:
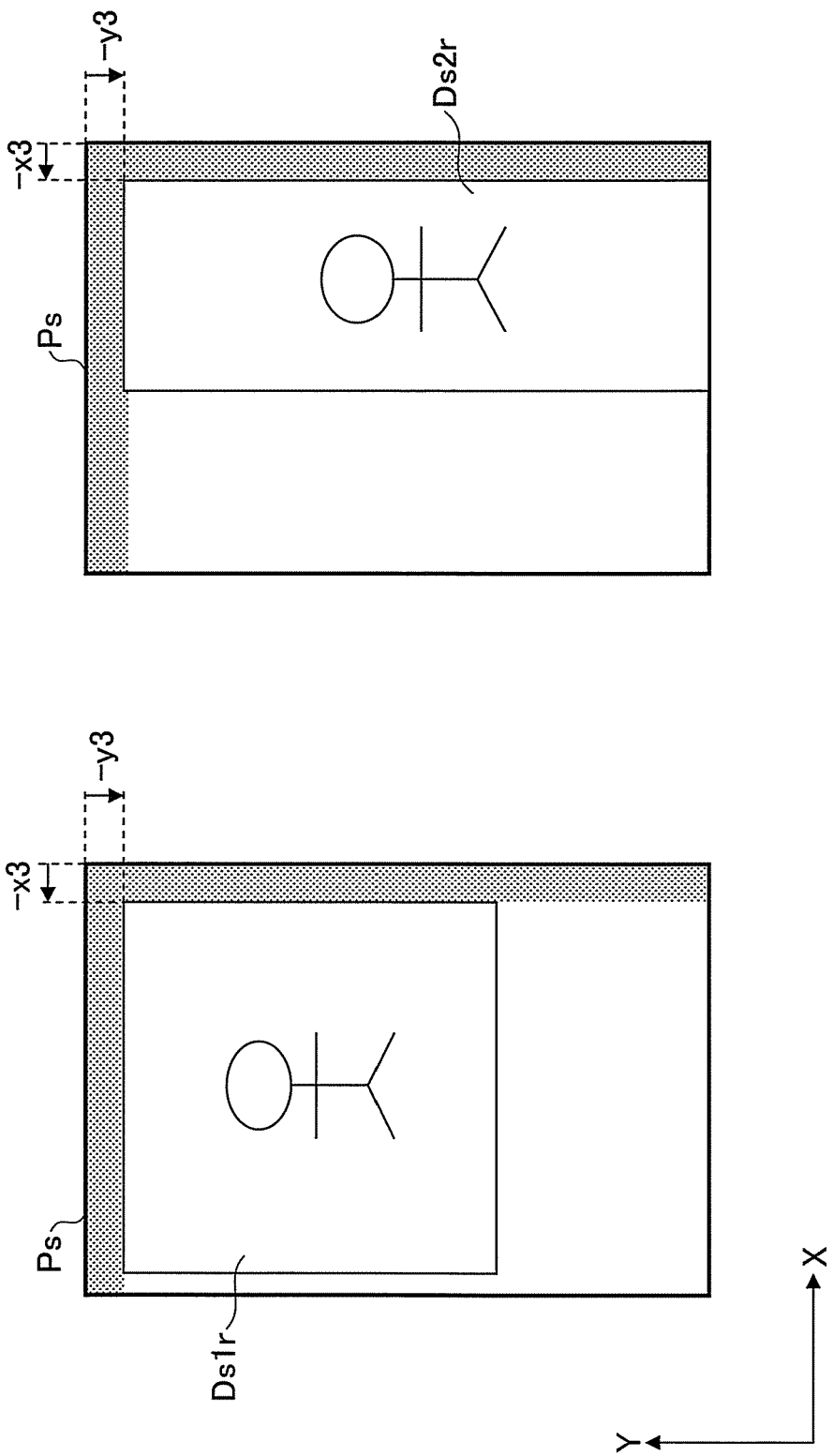
FIG. 15 is a diagram illustrating an example where a top right corner of the paper is specified as a corner position and a margin is set.

First, a description will be given of the case where the user assigns the "top right" as the corner position of the image of the print job to be printed on the paper, by referring to FIGS. 13 through 15. It is assumed for the sake of convenience that the print instruction instructs the paper size Ps of the paper on which the image of the print job is to be printed as being y cm in the Y-axis direction by x cm in the X-axis direction, and instructs reduction of images of different document sizes by a % (that is, as image reduction) to reduced images Ds1$r$ and Ds2$r$ illustrated in FIG. 13. Further, it is assumed for the sake of convenience that the print instruction instructs moving of the reduced images Ds1$r$ and Ds2$r$ to the top right of the paper as illustrated in FIG. 14 in order to provide a margin of x3 cm in the X-axis direction and a margin of y3 cm in the Y-axis direction as illustrated in FIG. 15.

When inputting the print instruction, the user inputs "a % reduction", "top right as corner position" and "margin of x3 cm by y3 cm" from the print setting part 12 of the client PC 10, for example. In this example, the original document size before the reduction is y1 cm by x1 cm for the example illustrated on the left side in each of FIGS. 13 through 15, and the original document size before the reduction is y2 cm by x2 cm for the example illustrated on the right side in each of FIGS. 13 through 15.

Figure 13:
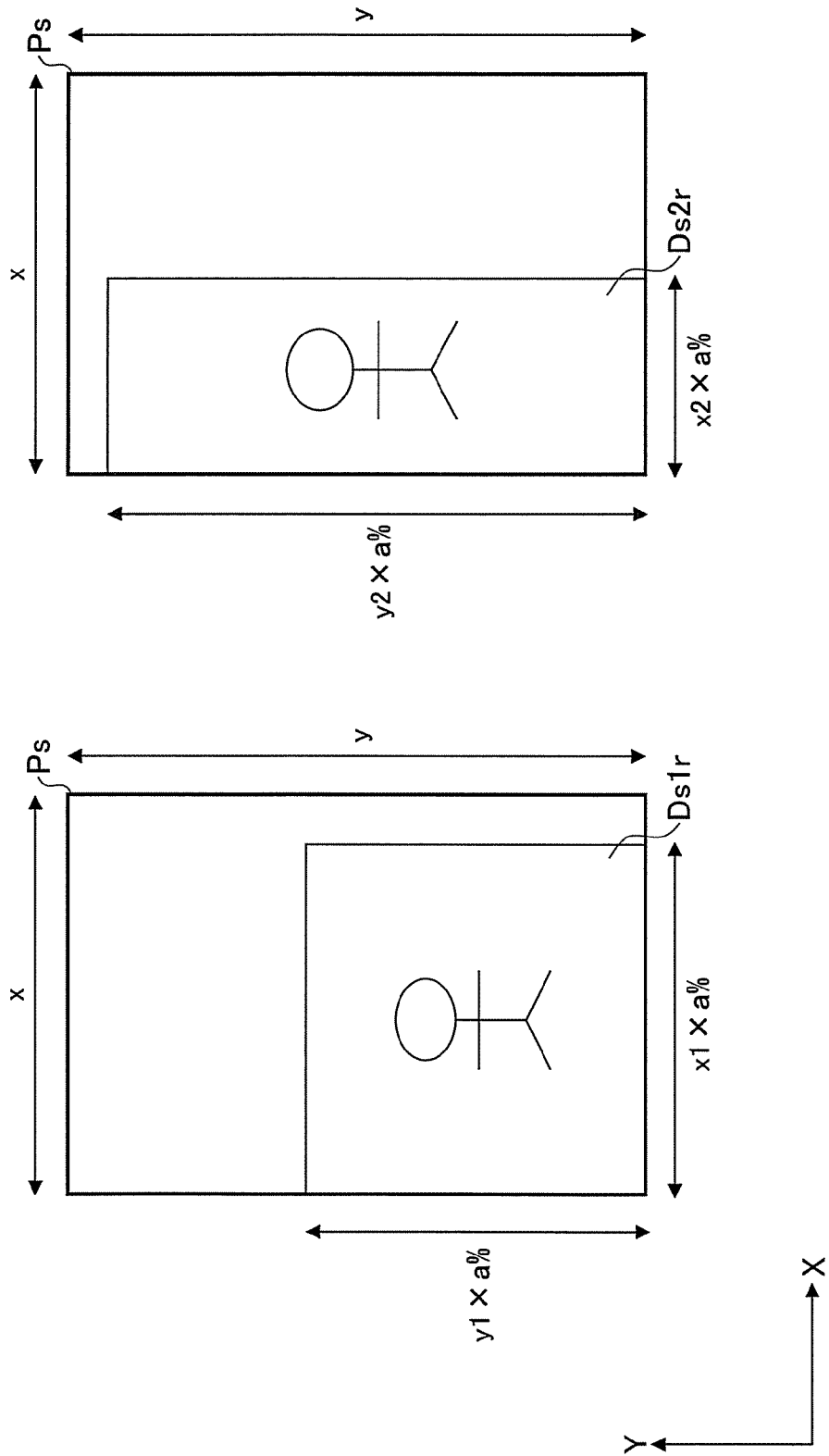
FIG. 13 is a diagram illustrating an example of an a % image reduction of images of different document sizes.

When the user inputs the "a % reduction", the size of the original image is reduced to the reduced image Ds1$r$ having the size of "y1 cm×a %" by "x1 cm×a %" for the example illustrated on the left side in FIG. 13 and is reduced to the reduced image Ds2$r$ having the size of "y2 cm×a %" by "x2 cm×a %" for the example illustrated on the right side in FIG. 13.

Thereafter, when the user inputs the "top right as corner position", the reduced images Ds1$r$ and Ds2$r$ are moved to the top right corner of the paper as illustrated in FIG. 14. In this case, the computation processing part 23 regards the bottom left corner of the paper as the origin, even when the "top right" is assigned to the corner position, and performs the computation process to move the reduced images Ds1$r$ and Ds2$r$ by adding a positive sign "+" to the image moving amount towards the rightward direction along the X-axis direction and adding a positive sign "+" to the image moving amount towards the upward direction along the Y-axis direction. Accordingly, the computation processing part 23 computes a moving amount Mx1 in the X-axis direction from Mx1=x−(x1×a %) and a moving amount My1 in the Y-axis direction from My1=y−(y1×a %) for the example illustrated on the left side in FIG. 14, and computes a moving amount Mx2 in the X-axis direction from Mx2=x−(x2×a %) and a moving amount My2 in the Y-axis direction from My2=y−(y2×a %) for the example illustrated on the right side in FIG. 14, by regarding the bottom left corner of the paper as the origin.

When the user thereafter inputs the "margin of x3 cm by y3 cm", the computation processing part 23 computes the amount of margin (or moving amount) of the reduced images Ds1$r$ and Ds2$r$ that have been moved to the top right corner of the paper in FIG. 14. More particularly, the computation processing part 23 computes an amount of margin (or moving amount) Mx3 in the X-axis direction from Mx3=x−(x1×a %)−x3 and an amount of margin (or moving amount) My3 in the Y-axis direction from My3=y (y1×a %)−y3 for the example illustrated on the left side in FIG. 15, and computes an amount of margin (or moving amount) Mx3 in the X-axis direction from Mx3=x−(x2×a %)−x3 and an amount of margin (or moving amount) My3 in the Y-axis direction from My3=y−(y3×a %)−y3 for the example illustrated on the right side in FIG. 15, by regarding the bottom left corner of the paper as the origin. The margins are indicated by hatchings in FIG. 15.

Accordingly, the computation processing part 23 computes the moving amount of the image of the print job to be printed on the paper by the image position adjustment, based on the inputs made by the user, including the reduction of the image of the print job, the corner position assignment, and the amount of margin set with reference to the corner position. In addition, the computation processing part 23 computes the moving amount of the image of the print job to be printed on the paper using the following formulas depending on the corner position assignment.

If the corner position assignment assigns the top right of the paper and a margin (x3, y3) is set, the moving amount of the image of the print job is computed by regarding the bottom left corner position of the paper as the origin. More particularly, the moving amount Mx3 in the X-axis direction is computed from Mx3=x−(x2×a %)−x3, and the moving amount My3 in the Y-axis direction is computed from My3=y−(y2×a %)−y3.

If the corner position assignment assigns the top left of the paper and a margin (x3, y3) is set, the moving amount of the image of the print job is computed by regarding the bottom left corner position of the paper as the origin. More particularly, the moving amount Mx3 in the X-axis direction is computed from Mx3=x3, and the moving amount My3 in the Y-axis direction is computed from My3=y−(y2×a %)−y3.

If the corner position assignment assigns the bottom right of the paper and a margin (x3, y3) is set, the moving amount of the image of the print job is computed by regarding the bottom left corner position of the paper as the origin. More particularly, the moving amount Mx3 in the X-axis direction is computed from Mx3=x−(x2×a %)−x3, and the moving amount My3 in the Y-axis direction is computed from My3=y3.

If the corner position assignment assigns the bottom left of the paper and a margin (x3, y3) is set, the moving amount of the image of the print job is computed by regarding the bottom left corner position of the paper as the origin. More particularly, the moving amount Mx3 in the X-axis direction is computed from Mx3=x3, and the moving amount My3 in the Y-axis direction is computed from My3=y3.

Next, a description will be given of the case where the user assigns the "center" as the corner position of the image of the print job to be printed on the paper, by referring to FIGS. 16 through 18. It is assumed for the sake of convenience that the print instruction instructs the paper size Ps of the paper on which the image of the print job is to be printed as being y cm in the Y-axis direction by x cm in the X-axis direction, and instructs reduction of images of different document sizes by a % (that is, a % image reduction) to reduced images Ds3r and Ds4r illustrated in FIG. 16. Further, it is assumed for the sake of convenience that the print instruction instructs moving of the reduced images Ds3r and Ds4r to the center of the paper as illustrated in FIGS. 17 and 18.

When inputting the print instruction, the user inputs "a % reduction" and "center arrangement (or center as corner position)" from the print setting part 12 of the client PC 10, for example. In this example, the original document size before the reduction is y11 cm by x11 cm for the example illustrated on the left side in FIG. 16, and the original document size before the reduction is y12 cm by x12 cm for the example illustrated on the right side in FIG. 16.

Figure 16:
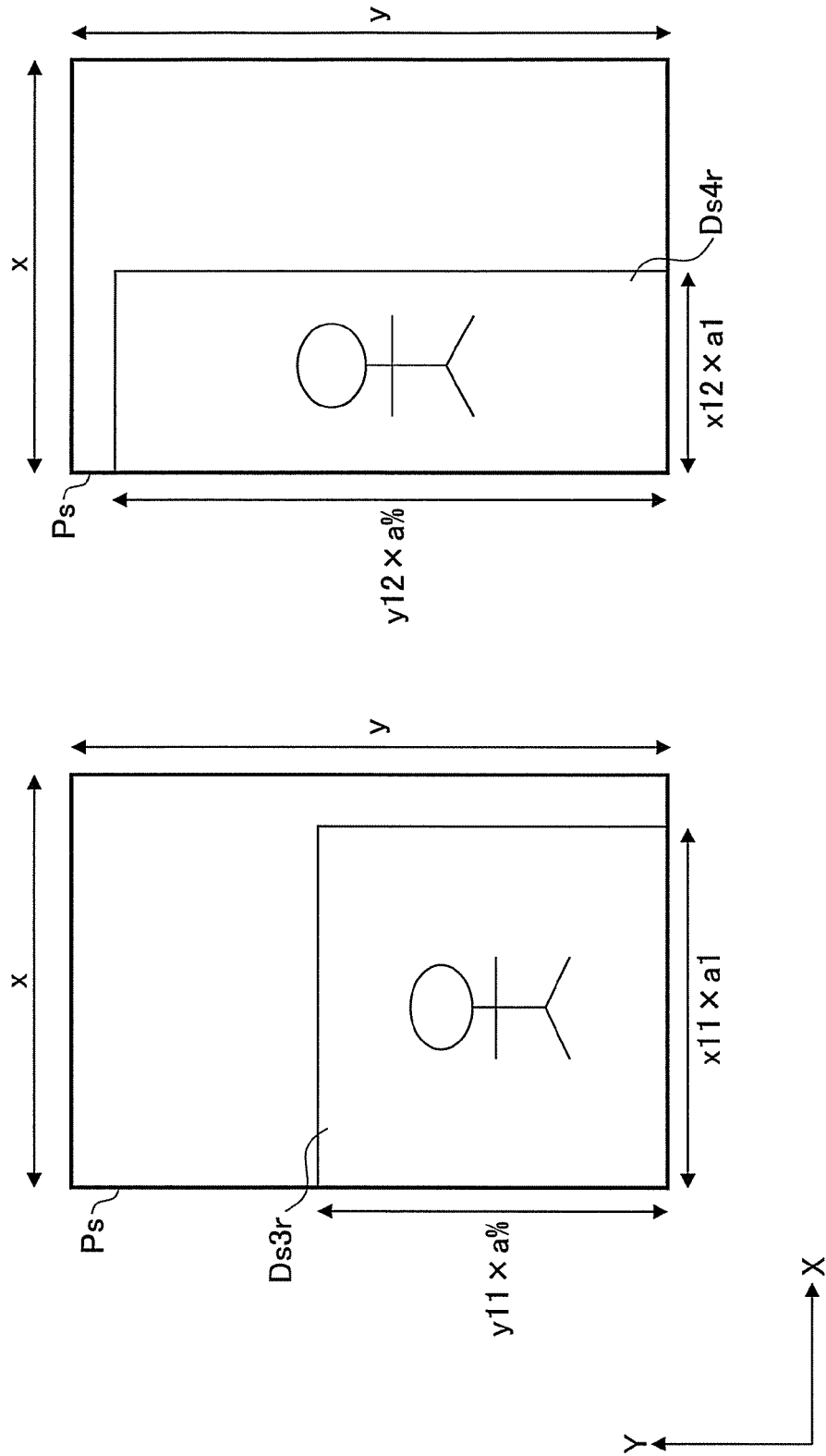
FIG. 16 is a diagram illustrating an example where the images of different document sizes are to be arranged in the central area of the paper.

When the user inputs the "a % reduction", the size of the original image is reduced to the reduced image Ds3r having the size of "y11 cm×a %" by "x11 cm×a %" for the example illustrated on the left side in FIG. 16 and is reduced to the reduced image Ds12r having the size of "y12 cm×a %" by "x12 cm×a %" for the example illustrated on the right side in FIG. 16.

Thereafter, when the user inputs the "center arrangement (or center as corner position)", the reduced images Ds3r and Ds4r are respectively moved to the center of the paper as illustrated in FIGS. 17 and 18. In this case, the computation processing part 23 regards the bottom left corner of the paper as the origin, even when the "center arrangement" is assigned, and performs the computation process to move the reduced images Ds3r and Ds4r by adding a positive sign "+" to the image moving amount towards the rightward direction along the X-axis direction and adding a positive sign "+" to the image moving amount towards the upward direction along the Y-axis direction. Accordingly, the computation processing part 23 computes a moving amount Mx11 in the X-axis direction from Mx11={x−(x11×a %)}/2 and a moving amount My11 in the Y-axis direction from My11={y−(y11×a %)}/2 for the example illustrated on the left side in FIG. 16, and computes a moving amount Mx12 in the X-axis direction from Mx12={x−(x12×a %)}/2 and a moving amount My12 in the Y-axis direction from My12={y−(y12×a %)}/2 for the example illustrated on the right side in FIG. 16, by regarding the bottom left corner of the paper as the origin.

As a result, the reduced image Ds3r in the example illustrated on the left side in FIG. 16 is moved to the center of the paper by the image position adjustment as illustrated in FIG. 17. Similarly, the reduced image Ds4r in the example illustrated on the right side in FIG. 16 is moved to the center of the paper by the image position adjustment as illustrated in FIG. 18.

Accordingly, the computation processing part 23 computes the moving amount of the image of the print job to be printed on the paper by the image position adjustment, based on the inputs made by the user, including the reduction of the image of the print job and the center arrangement. In addition, the computation processing part 23 computes the moving amount of the image of the print job to be printed on the paper using the following formulas.

If the center arrangement is set as the corner position assignment, the moving amount of the image of the print job is computed by regarding the bottom left corner position of the paper as the origin. More particularly, the moving amount Mx12 of the image of the print job in the X-axis direction is computed from Mx12={x−(x12×a %)}/2 and the moving amount My12 of the image of the print job in the Y-axis direction is computed from My12={y−(y12×a %)}/2.

Therefore, in the examples illustrated in FIGS. 13 through 18, the moving amount of the image of the print job may be computed from the above described formulas based on the paper size, a product of the document size and the reduction (a %), and the amount of margin (or image moving amount).

In the formulas used to compute the moving amount of the image of the print job, the paper size in the X-axis direction is the length of the paper in the X-axis direction when the corner position is located at the right end of the paper, but is 0 (zero) when the corner position is located at the left end of the paper. In addition, the paper size in the Y-axis direction is the length of the paper in the Y-axis direction when the corner position is located at the top end of the paper, but is 0 (zero) when the corner position is located at the bottom end of the paper.

A negative sign "−" is added to the product of the paper size in the X-axis direction and the reduction (a %) when the corner position is located at the right end of the paper, but this product is 0 (zero) when the corner position is located at the left end of the paper. Further, a negative sign "−" is added to the product of the paper size in the Y-axis direction and the reduction (a %) when the corner position is located at the top end of the paper, but this product is 0 (zero) when the corner position is located at the bottom end of the paper.

The amount of margin in the X-axis direction has the negative sign "−" when the corner position is located at the right end of the paper, and has the positive sign "+" when the corner position is located at the left end of the paper. In addition, the amount of margin in the Y-axis direction has the negative sign "−" when the corner position is located at the top end of the paper, and has the positive sign "+" when the corner position is located at the bottom end of the paper.

If the user inputs the amount of margin on the setting screen illustrated in FIGS. 11A through 11D, the computation processing part 23 refers to the following Table 1, which may be stored in the storage part 25, in order to add the appropriate sign to the amount of margin that is input for use in performing the computation described above. For example, if the corner position is located at the bottom right of the paper and the margin (x3, y3) is input on the setting screen, the amount of margin (or moving amount) Mx3 in the X-axis direction becomes Mx3=−x3 and the amount of margin (or moving amount) My3 in the Y-axis direction becomes My3=y3, with reference to the bottom left corner position of the paper that is regarded as the origin, by referring to the Table 1.

TABLE 1

| CORNER POSITION ASSIGNMENT (CORNERLOCK) | X-AXIS DIRECTION | Y-AXIS DIRECTION |
| --- | --- | --- |
| Bottom Right | − | + |
| Top Right | − | − |
| Bottom Left | + | + |
| Top left | + | − |

[Back Surface Adjustment in Duplex Printing]

Figure 19A:
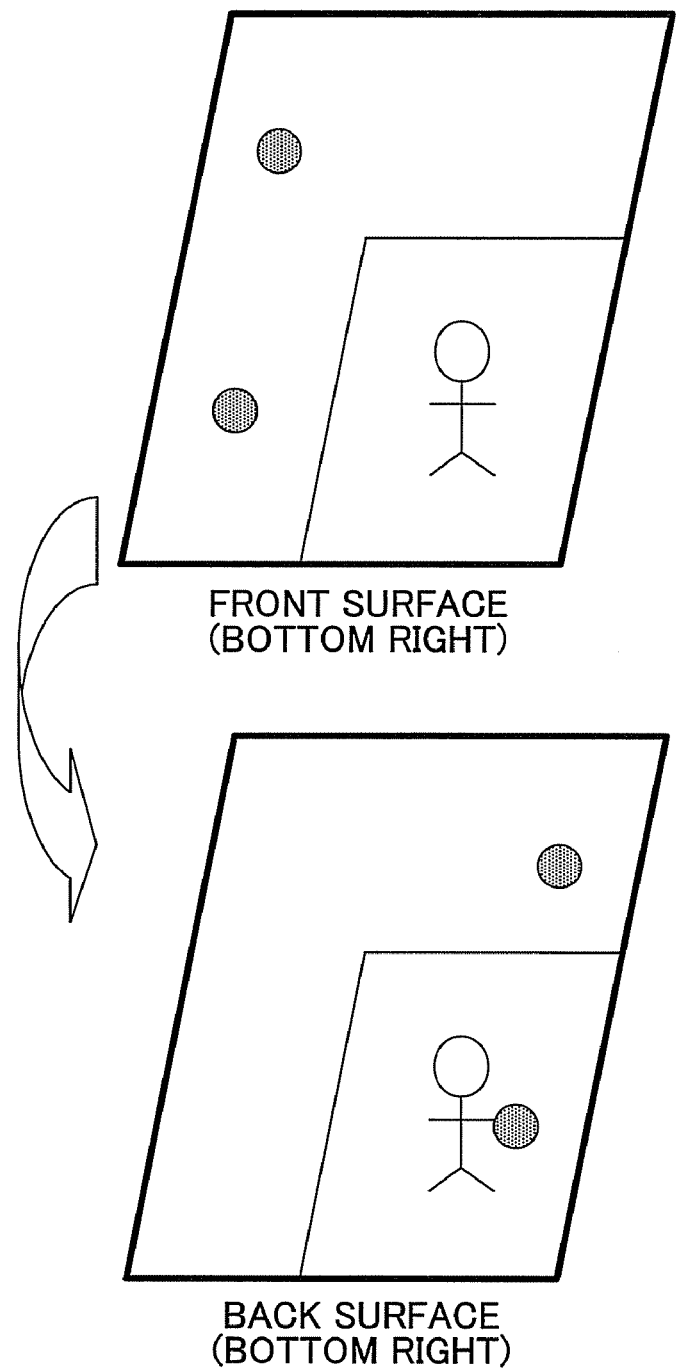
FIGS. 19A and 19B are diagrams illustrating examples of a back surface adjustment in a duplex printing.
Figure 19B:
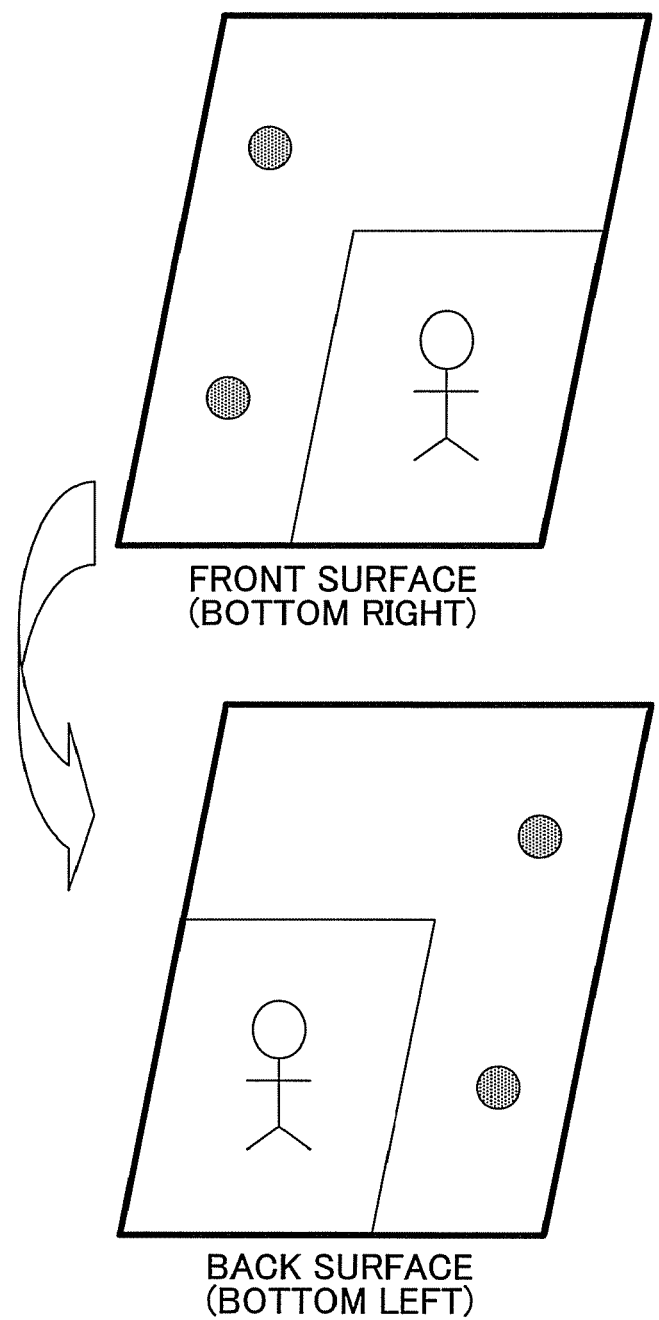

Next, a description will be given of a back surface adjustment when a duplex printer is set by the user, by referring to FIGS. 19A and 19B. FIGS. 19A and 19B are diagrams illustrating examples of the back surface adjustment in the duplex printing.

When binding the longer side of the paper in the duplex printing, the image position adjustment is made so that the image on the back surface of the paper is not arranged exactly on the back of the image on the front surface of the paper as illustrated in FIG. 19A, but is arranged at a moved position as illustrated in FIG. 19B, for example. If the image on the front surface of the paper is moved to the bottom right corner position of the paper, for example, the image on the back surface of the paper is moved not to the bottom right but to the bottom left of the paper. As a result, it becomes possible to avoid the image on the back surface of the paper from dropping out when holes, indicated by shaded circles in FIGS. 19A and 19B, are punched in the paper or, when pre-punched paper having the holes, is used.

In this example, separate settings are provided for the one-sided (1-sided) printing and the duplex printing. If the user selects the 1-sided printing or the duplex printing and inputs the moving amount on the setting screen, the computation processing part 23 refers to the following Table 2, which may be stored in the storage part 25, in order to set the corner position (or origin) of the image of the print job for use in performing the computation described above.

TABLE 2

| CORNER POSITION ASSIGNMENT (CORNERLOCK) | 1-Sided Printing | Duplex Printing (Longer Side) | Duplex Printing (Shorter Side) |
| --- | --- | --- | --- |
| Bottom Right | Bottom Right | Bottom Left | Top Right |
| Top Right | Top Right | Top Left | Bottom Right |
| Bottom Left | Bottom Left | Bottom Right | Top Left |
| Top Left | Top Left | Top Right | Bottom Left |

[Back Surface Adjustment Process]

Next, a description will be given of a back surface adjustment process when the duplex printing is set, by referring to FIG. 20. FIG. 20 is a flow chart for explaining the back surface adjustment in the duplex printing.

In a step S20 illustrated in FIG. 20, the computation processing part 23 judges whether the duplex printing is selected. The process ends if the judgement result in the step S20 is NO. If the judgement result in the step S20 is YES, the computation processing part 23 judges whether the longer side of the paper is to be bound, in a step S21. If the judgement result in the step S21 is YES, the computation processing part 23 judges whether the corner position assignment (CORNERLOCK) of the image of the print job on the front surface of the paper is the bottom right corner of the paper, in a step S22. If the judgement result in the step S22 is YES, the computation processing part 23 sets the corner position (origin on the back surface) of the image of the print job on the back surface of the paper to the bottom left corner of the paper, in a step S23, and the process ends. On the other hand, if the judgement result in the step S22 is NO, the computation processing part 23 judges whether the corner position assignment on the front surface of the paper is the top right corner of the paper, in a step S24.

If the judgement result in the step S24 is YES, the computation processing part 23 sets the origin on the back surface of the paper to the top left corner of the paper, in a step S25, and the process ends. If the judgement result in the step S24 is NO, the computation processing part 23 judges whether the corner position assignment on the front surface of the paper is the bottom left corner of the paper, in a step S26. If the judgement result in the step S26 is YES, the computation processing part 23 sets the origin on the back surface of the paper to the bottom left corner of the paper, in a step S27, and the process ends. If the judgement result in the step S26 is NO, the computation processing part 23 sets the origin on the back surface of the paper to the top left corner of the paper, in a step S28, and the process ends.

On the other hand, if the judgement result in the step S21 is NO (that is, the shorter side of the paper is to be bound), the computation processing part 23 judges whether the corner position assignment on the front surface of the paper is the bottom right corner of the paper, in a step S29. If the judgement result in the step S29 is YES, the computation processing part 23 sets the origin on the back surface of the paper to the top right corner of the paper, in a step S30, and the process ends. If the judgement result in the step S29 is NO, the computation processing part 23 judges whether corner position assignment on the front surface of the paper is the top right corner of the paper, in a step S31. If the judgement result in the step S31 is YES, the computation processing part 23 sets the origin on the back surface of the paper to the bottom right corner of the paper, in a step S32, and the process ends. If the judgement result in the step S31 is NO, the computation processing part 23 judges whether the corner position assignment on the front surface of the paper is the bottom left corner of the paper, in a step S33. If the judgement result in the step S33 is YES, the computation processing part 23 sets the origin on the back surface of the paper to the top left corner of the paper, in a step S34, and the process ends. If the judgement result in the step S33 is NO, the computation processing part 23 sets the origin on the back surface of the paper to the bottom left corner of the paper, in a step S35, and the process ends.

Therefore, even if the holes are punched in the paper or, pre-punched paper having the holes, is used, it is possible to prevent the images that are printed on the front and back surfaces of the paper from dropping out at the holes.

According to the embodiment described above, even in the case of a PDF direct print in which images of different document sizes coexist, it is possible to arrange and print the images on the paper at positions desired by the user, by making the same setting with respect to all print jobs.

Of course, the scaling in the embodiment described above is not limited to the reduction, and may include magnification.

Further, the present invention is not limited to these embodiments, but various variations and modifications may be made without departing from the scope of the present invention.

What is claimed is:

1. An image forming apparatus configured to print images of different document sizes on paper having a predetermined paper size, comprising:
    a computation processing part configured to compute a print position of the image with respect to the paper, based on the document size, the paper size and moving amount computation information that is input thereto; and
    a print processing part configured to arrange and print the image on the paper, based on the print position computed by the computation processing part,
    wherein the moving amount computation information includes a magnification of the image to be printed on the paper, a corner position that is used as a reference when computing the print position of the image to be printed on the paper, and an amount of margin at the corner position, and
    wherein the computation processing part sets the corner position on a back side of the paper when binding a longer side of the paper in a duplex printing to:
        a bottom left corner of the back side of the paper if a bottom right corner on a front side of the paper is set as the corner position on the front side;
        a top left corner of the back side of the paper if a top right corner on the frontside of the paper is set as the corner position on the front side;
        a bottom right corner of the back side of the paper if a bottom left corner on the front side of the paper is set as the corner position on the front side; and
        a top right corner of the back side of the paper if a top left corner on the front side of the paper is set as the corner position on the front side.

2. The image forming apparatus as claimed in claim 1, wherein the computation processing part adds to the amount of margin:
    a negative sign in a leftward direction along an X-axis direction and a positive sign in an upward direction along a Y-axis direction that is perpendicular to the X-axis direction when a bottom right corner of the paper is assigned to the corner position, where X-axis direction extends horizontally from the right to left or vice versa;
    a negative sign in the leftward direction along the X-axis direction and a positive sign in a downward direction along the Y-axis direction when a top right corner of the paper is assigned to the corner position;
    a positive sign in a rightward direction along the X-axis direction and a positive sign in the upward direction along the Y-axis direction when a bottom left corner of the paper is assigned to the corner position; and
    a positive sign in the rightward direction along the X-axis direction and a negative sign in the downward direction along the Y-axis direction when a top left corner of the paper is assigned to the corner position.

3. An image forming method for printing images of different document sizes on paper having a predetermined paper size, comprising:
    computing a print position of the image with respect to the paper, based on the document size, the paper size and moving amount computation information that is input thereto; and
    arranging and printing the image on the paper, based on the print position that is computed by the computing,
    wherein the moving amount computation information includes a magnification of the image to be printed on the paper, a corner position that is used as a reference when computing the print position of the image to be printed on the paper, and an amount of margin at the corner position, and
    wherein said computing sets the corner position on a back side of the paper when binding a longer side of the paper in a duplex printing to:
        a bottom left corner of the back side of the paper if a bottom right corner on a front side of the paper is set as the corner position on the front side;
        a top left corner of the back side of the paper if a top right corner on the front side of the paper is set as the corner position on the front side;
        a bottom right corner of the back side of the paper if a bottom left corner on the front side of the paper is set as the corner position on the front side; and
        a top right corner of the back side of the paper if a top left corner on the front side of the paper is set as the corner position on the front side.

4. The image forming method as claimed in claim 3, wherein said computing adds to the amount of margin:
    a negative sign in a leftward direction along an X-axis direction and a positive sign in an upward direction along a Y-axis direction that is perpendicular to the X-axis direction when a bottom right corner of the paper is assigned to the corner position, where X-axis direction extends horizontally from the right to left or vice versa;
    a negative sign in the leftward direction along the X-axis direction and a positive sign in a downward direction along the Y-axis direction when a top right corner of the paper is assigned to the corner position;
    a positive sign in a rightward direction along the X-axis direction and a positive sign in the upward direction along the Y-axis direction when a bottom left corner of the paper is assigned to the corner position; and
    a positive sign in the rightward direction along the X-axis direction and a negative sign in the downward direction along the Y-axis direction when a top left corner of the paper is assigned to the corner position.

5. A non-transitory computer-readable storage medium that stores a program which, when executed by a computer, causes the computer perform an image forming process including printing images of different document sizes on paper having a predetermined paper size, said image forming process comprising:
    a computation processing procedure to compute a print position of the image with respect to the paper, based on the document size, the paper size and moving amount computation information that is input thereto; and a print processing procedure to arrange and print the image on the paper, based on the print position computed by the computation processing procedure, wherein the moving amount computation information includes a magnification of the image to be printed on the paper, a corner position that is used as a reference when computing the print position of the image to be printed on the paper, and an amount of margin at the corner position, wherein the computation processing procedure sets the corner position on a back side of the paper when binding a longer side of the paper in a duplex printing to:

a bottom left corner of the back side of the paper if a bottom right corner on a front side of the paper is set as the corner position on the front side;

a top left corner of the back side of the paper if a top right corner on the front side of the paper is set as the corner position on the front side;

a bottom right corner of the back side of the paper if a bottom left corner on the front side of the paper is set as the corner position on the front side; and a top right corner of the back side of the paper if a top left corner on the front side of the paper is set as the corner position on the front side.

6. The non-transitory computer-readable storage medium as claimed in claim 5, wherein the computation processing procedure adds to the amount of margin:

a negative sign in a leftward direction along an X-axis direction and a positive sign in an upward direction along a Y-axis direction that is perpendicular to the X-axis direction when a bottom right corner of the paper is assigned to the corner position, where X-axis direction extends horizontally from the right to left or vice versa;

a negative sign in the leftward direction along the X-axis direction and a positive sign in a downward direction along the Y-axis direction when a top right corner of the paper is, assigned to the corner position;

a positive sign in a rightward direction along the X-axis direction and a positive sign in the upward direction along the Y-axis direction when a bottom left corner of the paper is assigned to the corner position; and a positive sign in the rightward direction along the X-axis direction and a negative sign in the downward direction along the Y-axis direction when a top left corner of the paper is assigned to the corner position.

\* \* \* \* \*